US012707364B2

(12) United States Patent
Hu et al.

(10) Patent No.: US 12,707,364 B2
(45) Date of Patent: Aug. 11, 2026

(54) MOBILITY OPTIMIZATION METHOD AND RELATED APPARATUS

(71) Applicant: Huawei Technologies Co., Ltd., Shenzhen (CN)

(72) Inventors: Xingxing Hu, Shanghai (CN); Le Yan, Shenzhen (CN); Hongping Zhang, Shenzhen (CN); Hongzhuo Zhang, Shanghai (CN); Tingting Geng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 863 days.

(21) Appl. No.: 17/738,431

(22) Filed: May 6, 2022

(65) Prior Publication Data

US 2022/0264414 A1 Aug. 18, 2022

Related U.S. Application Data

(63) Continuation of application No. PCT/CN2020/076058, filed on Feb. 20, 2020.

(30) Foreign Application Priority Data

Nov. 8, 2019 (WO) ................ PCT/CN2019/116877

(51) Int. Cl.
*H04W 36/08* (2009.01)
*H04W 36/00* (2009.01)
(Continued)

(52) U.S. Cl.
CPC ..... *H04W 36/305* (2018.08); *H04W 36/0061* (2013.01); *H04W 36/00695* (2023.05);
(Continued)

(58) Field of Classification Search
CPC ............... H04W 36/305; H04W 76/20; H04W 36/00837; H04W 36/00695; H04W 36/0061; H04W 36/08; H04W 36/00698
See application file for complete search history.

(56) References Cited

U.S. PATENT DOCUMENTS

2011/0117908 A1 5/2011 Huang et al.
2013/0303155 A1 11/2013 Da Silva et al.
(Continued)

FOREIGN PATENT DOCUMENTS

CN 102131257 A 7/2011
CN 102271319 A 12/2011
(Continued)

OTHER PUBLICATIONS

PE2E-Search Machine Translation of CN-108810962-A, published on Nov. 13, 2018. (Year: 2018).*
(Continued)

*Primary Examiner* — Rafael Pérez-Gutiérrez
*Assistant Examiner* — Gilbert M. Grant
(74) *Attorney, Agent, or Firm* — Slater Matsil, LLP

(57) ABSTRACT

A mobility optimization method and a related apparatus are provided. The method includes: determining connection failure information; and sending the connection failure information and an identifier of a first cell to a first network device by using a radio resource control (RRC) message, wherein the identifier of the first cell comprises an identifier of a cell from which a reconfiguration message or a handover command message received by the terminal device comes or an identifier of a cell in which a connection failure
(Continued)

occurs, wherein the connection failure information is in a form of a container in the RRC message and the identifier of the first cell is outside the container.

19 Claims, 7 Drawing Sheets

(51) Int. Cl.
*H04W 36/30* (2009.01)
*H04W 76/20* (2018.01)

(52) U.S. Cl.
CPC ..... *H04W 36/00837* (2018.08); *H04W 36/08* (2013.01); *H04W 76/20* (2018.02); *H04W 36/00698* (2023.05)

(56) References Cited

U.S. PATENT DOCUMENTS

| | | | | |
|---|---|---|---|---|
| 2015/0092746 | A1 | 4/2015 | Jang et al. | |
| 2015/0208295 | A1 | 7/2015 | da Silva et al. | |
| 2016/0192249 | A1* | 6/2016 | Wu | H04W 76/19 370/331 |
| 2017/0013518 | A1* | 1/2017 | Kilgour | H04W 36/0066 |
| 2019/0182726 | A1* | 6/2019 | Wu | H04W 36/22 |
| 2019/0215756 | A1 | 7/2019 | Park et al. | |
| 2019/0349833 | A1* | 11/2019 | Peng | H04W 36/322 |
| 2020/0245195 | A1* | 7/2020 | Zhu | H04W 36/12 |
| 2021/0014893 | A1* | 1/2021 | Park | H04W 80/08 |
| 2022/0007255 | A1* | 1/2022 | Rugeland | H04W 76/19 |
| 2022/0046497 | A1* | 2/2022 | Wang | H04W 36/008375 |

FOREIGN PATENT DOCUMENTS

| | | | | | |
|---|---|---|---|---|---|
| CN | 103298004 | A | | 9/2013 | |
| CN | 103391567 | A | | 11/2013 | |
| CN | 103797846 | A | | 5/2014 | |
| CN | 103856980 | A | | 6/2014 | |
| CN | 105264955 | A | | 1/2016 | |
| CN | 107690162 | A | | 2/2018 | |
| CN | 108810962 | A | * | 11/2018 | H04W 24/10 |
| CN | 110035463 | A | | 7/2019 | |
| CN | 111586739 | A | | 8/2020 | |
| GB | 2518667 | A | * | 4/2015 | H04W 36/0077 |
| JP | 2013539944 | A | | 10/2013 | |
| WO | 2015140848 | A1 | | 9/2015 | |

OTHER PUBLICATIONS

Vivo, "Enhanced RACH-less solution for NR", 3GPP TSG-RAN WG2 Meeting #106, R2-1905975, May 13-May 17, 2019, 8 pages, Reno, USA.

Huawei, HiSilicon, "Discussion on RLF reporting for inter-RAT case", 3GPP TSG-RAN WG2 Meeting#107, R2-1910993, Aug. 26-30, 2019, 3 pages, Prague, Czech Republic.

3GPP TS 36.331 V15.7.0 (Sep. 2019), 3rd Generation Partnership Project; Technical Specification Group Radio Access Network; Evolved Universal Terrestrial Radio Access (E-UTRA); Radio Resource Control (RRC); Protocol specification (Release 15), 962 pages.

3GPP TS 36.300 V15.7.0 (Sep. 2019), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15), 365 pages.

Vivo, "Remaining issues on MCG fast recovery", 3GPP TSG-RAN WG2 Meeting #106, R2-1905827, May 13-17, 2019, 4 pages, Reno, USA.

3GPP TS 38.331 V15.7.0 (Sep. 2019), 3rd Generation Partnership Project; Technical Specification Group Radio Access Network; NR; Radio Resource Control (RRC) protocol specification(Release 15), 527 pages.

Vivo, Ericsson(Rapporteur), "MCG link fast recovery in MR-DC", 3GPP TSG-RAN2 Meeting #106, R2-1905812, May 13-17, 2019, 3 pages, Reno, USA.

3GPP TS 38.423 V15.5.0 (Sep. 2019), 3rd Generation Partnership Project; Technical Specification Group Radio Access Network; NG-RAN; Xn application protocol (XnAP)(Release 15), 311 pages.

3GPP TS 38.413 V15.5.0 (Sep. 2019), 3rd Generation Partnership Project; Technical Specification Group Radio Access Network; NG-RAN; NG Application Protocol (NGAP)(Release 15), 329 pages.

Ericsson, "TP to Stage-2 on Mobility Robustness Optimization for TS 38.300", 3GPP TSG RAN WG2 #107 R2-1910853, Prague, CZ, Aug. 26-30, 2019, 18 pages.

Huawei et al., "Mobility Robustness Optimization", 3GPP TSG RANWG3 #105 R3-193754, Ljubljana, Slovenia, Aug. 26-30, 2019, 10 pages.

Huawei, "RLF report over S1", 3GPP TSG-RAN WG3 Meeting #77bis, R3-122081, Oct. 8-12, 2012, 2 pages, Lecce, Italy.

* cited by examiner

MOBILITY OPTIMIZATION METHOD AND RELATED APPARATUS

CROSS-REFERENCE TO RELATED APPLICATIONS

This application is a continuation of International Application No. PCT/CN2020/076058, filed on Feb. 20, 2020, which claims priority of International Application No. PCT/CN2019/116877, filed on Nov. 8, 2019. The disclosures of the aforementioned applications are hereby incorporated by reference in their entireties.

TECHNICAL FIELD

This application relates to the field of mobile communications technologies, and in particular, to a mobility optimization method and a related apparatus.

BACKGROUND

In a mobile communications system, as a terminal device moves, a network of the terminal device is handed over from a source cell to a target cell for data transmission. In a handover (HO) procedure, if a handover related parameter (for example, a measurement filter coefficient, time to trigger, a hysteresis threshold, or a trigger threshold) is inappropriately configured, problems such as too late handover (too late HO), too early handover (too early HO), and handover to a wrong cell (HO to wrong cell) may be caused. Consequently, the terminal device is disconnected from a network device, causing data interruption.

Currently, when the terminal device detects a connection failure (for example, a radio link failure (RLF)) or a handover failure (for example, a timer T304 expires), the terminal device performs radio resource control (RRC) reestablishment. The terminal device includes failure information of the connection failure or the handover failure in an RRC reestablishment request message. The network device may determine, by using the failure information in the RRC reestablishment request, whether the terminal device has problems such as too late handover, too early handover, and handover to a wrong cell. Therefore, when the terminal device performs RRC reestablishment after the connection failure or the handover failure, the network device determines the problems such as too late handover, too early handover, and handover to a wrong cell.

However, in some cases, the terminal device performs no RRC reestablishment. For example, in a mobility enhancement solution proposed by the 3rd generation partnership project (3GPP), when the network of the terminal device fails to be handed over from the source cell to the target cell, or when the terminal device detects the RLF in the source cell after the terminal device receives a handover message and before a random access (RACH) procedure in the target cell succeeds, the terminal device performs no RRC reestablishment. For another example, in multi-radio dual connectivity (MR-DC) in 5th generation mobile communications technology (5th generation mobile networks, 5G) standard Release R16, the terminal device performs no RRC reestablishment when the terminal device detects the RLF in a master cell group (MCG). Therefore, in these cases, if the terminal device performs no RRC reestablishment, how to determine too late handover, too early handover, and handover to a wrong cell becomes a problem to be urgently resolved.

SUMMARY

Embodiments of this application provide a mobility optimization method and a related apparatus, to determine too late handover, too early handover, and handover to a wrong cell in mobility enhancement and/or MR-DC proposed by the 3GPP, and optimize a mobility parameter, thereby implementing mobility robustness optimization.

The following describes this application from different aspects. It should be understood that mutual reference may be made to the following implementations and beneficial effects of the different aspects.

According to a first aspect, an embodiment of this application provides a mobility optimization method. The method includes: A terminal device sends connection failure information to a first network device; and after receiving the connection failure information, the first network device determines a connection failure type of the terminal device. Optionally, after determining the connection failure type of the terminal device, the first network device may optimize a mobility parameter. The mobility parameter may include one or more of the following: a measurement filter coefficient, a corresponding measurement trigger threshold or periodicity, time to trigger, or a hysteresis threshold. The connection failure information may be used to indicate that the terminal device detects an RLF in a first cell or fails to be handed over to the first cell. There is a wireless connection between the terminal device and a second cell in a procedure of handover from the second cell to the first cell, and the second cell is a cell managed by the first network device. The connection failure type may include too early handover and/or handover to a wrong cell. The connection failure type may be used for mobility robustness optimization.

Optionally, the first cell is a target cell, the second cell is a source cell, and the first network device is a source base station. The first cell (the target cell) and the second cell (the source cell) may be cells managed by a same network device, that is, both the first cell and the second cell are cells managed by the first network device. The first cell and the second cell may alternatively be cells managed by different network devices. For example, the second cell is a cell managed by the first network device, and the first cell is a cell managed by a second network device.

In this embodiment of this application, after the terminal device detects the RLF in the target cell or fails to be handed over to the target cell, the terminal device sends the connection failure information to the first network device (the source base station), where the connection failure information may trigger the first network device to determine the connection failure type (too early handover or handover to a wrong cell) of the terminal device. After receiving the connection failure information, the first network device determines the connection failure type of the terminal device. The connection failure type may be used for mobility robustness optimization. In this way, too early handover and handover to a wrong cell are determined in a mobility enhancement scenario, and the mobility parameter is optimized, thereby implementing mobility robustness optimization.

With reference to the first aspect, in a possible implementation, that the first network device determines a connection failure type of the terminal device is specifically as follows: If the first network device determines that the terminal device still keeps the wireless connection to the second cell (the source cell) after the terminal device detects the RLF in the first cell (the target cell) or fails to be handed over to the first cell (the target cell) (or the first network device determines that the terminal device camps on the source cell), the first network device determines that the connection failure type of the terminal device is too early handover; or if the first network device determines that a third cell is a cell to be accessed by the terminal device (or the first network device determines that the terminal device is handed over to a new target cell), the first network device determines that the connection failure type of the terminal device is handover to a wrong cell. The third cell is different from the first cell (that is, the target cell) and the second cell (that is, the source cell). That there is a wireless connection between the terminal device and a second cell in a procedure of handover from the second cell to the first cell means that the terminal device can perform data communication in the second cell (the source cell).

This embodiment of this application provides a criterion for determining too early handover and handover to a wrong cell in the mobility enhancement scenario. That is, when determining that the terminal device camps on the source cell, the first network device determines that the connection failure type of the terminal device is too early handover; or when determining that the terminal device is handed over to a new target cell, the first network device determines that the connection failure type of the terminal device is handover to a wrong cell. In this way, too early handover and handover to a wrong cell are determined in the mobility enhancement scenario, and the mobility parameter is optimized, thereby implementing mobility robustness optimization.

With reference to the first aspect, in a possible implementation, the first cell is a candidate cell that is in at least one candidate cell of the terminal device and that satisfies a conditional handover CHO trigger condition, and the third cell is different from the second cell and any one of the at least one candidate cell. That there is a wireless connection between the terminal device and a second cell in a procedure of handover from the second cell to the first cell means that the terminal device keeps a connection configuration in the second cell (the source cell), but cannot perform data communication. According to this embodiment of this application, too early handover and handover to a wrong cell can be determined in a conditional handover CHO scenario.

With reference to the first aspect, in a possible implementation, before that the first network device receives the connection failure information from the terminal device, the method further includes: The first network device sends first indication information to the terminal device, where the first indication information is used to indicate the terminal device to access the second cell (the source cell) when the terminal device fails to be handed over to the first cell (the target cell). According to this embodiment of this application, in the CHO scenario, when random access to the target cell fails, a rollback to communication in the source cell can be performed.

According to a second aspect, an embodiment of this application provides another mobility optimization method. The method includes: When detecting an RLF in a first cell in a procedure of handover from the first cell to a second cell, a terminal device sends connection failure information to a second network device; after receiving the connection failure information, the second network device may send the connection failure information to a first network device; and after receiving the connection failure information, the first network device determines a connection failure type of the terminal device. Optionally, after determining the connection failure type of the terminal device, the first network device may optimize a mobility parameter. The mobility parameter may include one or more of the following: a measurement filter coefficient, a corresponding measurement trigger threshold or periodicity, time to trigger, a hysteresis threshold, or the like. The connection failure information may be used to indicate that the terminal device detects the RLF in the first cell in the procedure of handover from the first cell (that is, a source cell) to the second cell (that is, a target cell). In the handover procedure, before the terminal device detects the RLF in the source cell, the terminal device keeps a wireless connection to the source cell. When the terminal device detects the RLF in the source cell, the wireless connection between the terminal device and the source cell is broken, that is, the terminal device cannot perform data communication in the source cell in this case. The first cell is a cell managed by the first network device. The connection failure type may include too late handover. The connection failure type may be used for mobility robustness optimization.

Optionally, the first cell is the source cell, the second cell is the target cell, and the first network device is a source base station. The first cell (the source cell) and the second cell (the target cell) may be cells managed by a same network device, that is, both the first cell and the second cell are cells managed by the first network device, and the first network device and the second network device are a same physical device. The first cell and the second cell may alternatively be cells managed by different network devices. For example, the second cell is a cell managed by the first network device, and the first cell is a cell managed by the second network device.

In this embodiment of this application, after detecting the RLF in the source cell in the procedure of handover from the first cell to the second cell, the terminal device sends the connection failure information to the second network device, and after receiving the connection failure information, the second network device may send the connection failure information to the first network device. The connection failure information may trigger the first network device to determine the connection failure type (too late handover) of the terminal device. After receiving the connection failure information, the first network device determines the connection failure type of the terminal device. The connection failure type may be used for mobility robustness optimization. In this way, too late handover is determined in a mobility enhancement scenario, and the mobility parameter is optimized, thereby implementing mobility robustness optimization.

With reference to the second aspect, in a possible implementation, that the first network device determines a connection failure type of the terminal device is specifically as follows: If the first network device determines that time for which the terminal device camps on the first cell (the source cell) is greater than a second threshold (or the first network device determines that time for which the terminal device camps on the source cell is excessively long) and the terminal device successfully accesses the second cell (the target cell), the first network device determines that the connection failure type of the terminal device is too late handover.

In this application, the time for which the terminal device camps on the first cell is time for which the terminal device keeps an RRC connection to the first cell, or time for which the terminal device keeps the wireless connection to the first cell, or time for which the terminal device has a connection to the first cell but does not receive a handover command.

This embodiment of this application provides a criterion for determining too late handover in the mobility enhancement scenario. That is, when the first network device determines that the time for which the terminal device camps on the source cell is excessively long and the terminal device successfully accesses the target cell, the first network device determines that the connection failure type of the terminal device is too late handover. In this way, too late handover is determined in the mobility enhancement scenario, and the mobility parameter is optimized, thereby implementing mobility robustness optimization.

With reference to the second aspect, in a possible implementation, the second cell is a candidate cell that is in at least one candidate cell of the terminal device and that satisfies a CHO trigger condition. According to this embodiment of this application, too late handover can be determined in a CHO scenario.

According to a third aspect, an embodiment of this application provides still another mobility optimization method. The method includes: When detecting an RLF in a master cell group MCG, a terminal device sends connection failure information to a second network device; after receiving the connection failure information, the second network device forwards the connection failure information to a first network device; and after receiving the connection failure information, the first network device determines a connection failure type of the terminal device. Optionally, after determining the connection failure type of the terminal device, the first network device may optimize a mobility parameter. The mobility parameter may include one or more of the following: a measurement filter coefficient, a corresponding measurement trigger threshold or periodicity, time to trigger, a hysteresis threshold, or the like. The connection failure information may be used to indicate that the terminal device detects the RLF in the MCG managed by the first network device. The connection failure type may include too late handover, too early handover, and handover to a wrong cell. The connection failure type may be used for mobility robustness optimization. The second network device is a secondary network device (also referred to as a secondary node) SN.

In this embodiment of this application, after detecting the RLF in the MCG managed by the first network device, the terminal device sends the connection failure information to the second network device (the SN), and after receiving the connection failure information, the second network device may send the connection failure information to the first network device. The connection failure information may trigger the first network device to determine the connection failure type (too late handover, too early handover, or handover to a wrong cell) of the terminal device. After receiving the connection failure information, the first network device determines the connection failure type of the terminal device. The connection failure type may be used for mobility robustness optimization. In this way, too late handover, too early handover, or handover to a wrong cell is determined in a dual connectivity scenario, and the mobility parameter is optimized, thereby implementing mobility robustness optimization.

With reference to the third aspect, in a possible implementation, that the first network device determines a connection failure type of the terminal device is specifically as follows: If the first network device determines that a fourth cell (for example, a cell D) is a cell to be accessed by the terminal device (or the first network device determines that a primary cell PCell of the terminal device changes to a new cell, where the new cell is different from the primary cell in the MCG managed by the first network device, for example, the primary cell PCell of the terminal device changes from a cell A to the cell D), the first network device determines that the connection failure type of the terminal device is too late handover. The fourth cell is different from the primary cell in the MCG managed by the first network device. The first network device is a source master network device (also referred to as a source master node), that is, a source MN.

This embodiment of this application provides a criterion for determining too late handover in the dual connectivity scenario. That is, when the first network device determines that the primary cell PCell of the terminal device changes to the new cell, the first network device determines that the connection failure type of the terminal device is too late handover. In this way, too late handover is determined in the dual connectivity scenario, and the mobility parameter is optimized, thereby implementing mobility robustness optimization.

With reference to the third aspect, in a possible implementation, that the first network device determines a connection failure type of the terminal device is specifically as follows: If the first network device determines that the source master network device has recently sent, to the terminal device, a handover message used to indicate that the primary cell changes (for example, the primary cell changes from the cell A to a cell B) and determines that a fifth cell (for example, the cell A) is a cell to be accessed by the terminal device (or determines that the terminal device camps on the primary cell that is not changed, for example, the cell A), the first network device determines that the connection failure type of the terminal device is too early handover. The fifth cell is a cell that is accessed before the primary cell in the MCG managed by the first network device is handed over to. If the first network device determines that the source master network device has recently sent, to the terminal device, a handover message used to indicate that the primary cell changes (for example, the primary cell changes from the cell A to a cell B) and determines that a sixth cell (for example, a cell C) is a cell to be accessed by the terminal device (or determines that the terminal device is handed over to a new primary cell, where the new primary cell is different from the cells A and B), the first network device determines that the connection failure type of the terminal device is handover to a wrong cell. The sixth cell is different from the primary cell in the MCG managed by the first network device and the fifth cell. The first network device is a target master network device, that is, a target MN.

This embodiment of this application provides a criterion for determining too early handover and handover to a wrong cell in the dual connectivity scenario. That is, when the first network device determines that the source master network device has recently sent, to the terminal device, a handover message used to indicate that the primary cell changes and determines that the terminal device camps on the primary cell that is not changed, the first network device determines that the connection failure type of the terminal device is too early handover. When the first network device determines that the source master network device has recently sent, to the terminal device, a handover message used to indicate that the primary cell changes and determines that the terminal device is handed over to a new primary cell, the first network device determines that the connection failure type of the terminal device is handover to a wrong cell. In this way, too early handover and handover to a wrong cell are determined in the dual connectivity scenario, and the mobility parameter is optimized, thereby implementing mobility robustness optimization.

With reference to the third aspect, in a possible implementation, the first network device is a target master network device. After that the first network device determines a connection failure type of the terminal device, the method further includes: The first network device sends second indication information to the source master network device, where the second indication information may be used to indicate that the connection failure type of the terminal device is too early handover or handover to a wrong cell.

According to a fourth aspect, an embodiment of this application provides still another mobility optimization method. The method includes: When a terminal device detects an RLF in a first cell or fails to be handed over from the first cell to a second cell, the terminal device sends connection failure information; and after receiving the connection failure information, the first network device determines a connection failure type of the terminal device. Optionally, after determining the connection failure type of the terminal device, the first network device may optimize a mobility parameter. The mobility parameter may include one or more of the following: a measurement filter coefficient, a corresponding measurement trigger threshold or periodicity, time to trigger, a hysteresis threshold, or the like. The connection failure information may be used to indicate that the terminal device detects the RLF in the first cell or fails to be handed over from the first cell to the second cell. The connection failure type may include too late handover, too early handover, and handover to a wrong cell. The connection failure type may be used for mobility robustness optimization.

With reference to the fourth aspect, in a possible implementation, the first cell is a source cell managed by the first network device, the first network device is a source base station, the second cell is a target cell, and the connection failure information is used to indicate that the terminal device detects the RLF in the first cell (the source cell). That the first network device determines a connection failure type of the terminal device is specifically as follows: If the first network device determines that time for which the terminal device camps on the first cell (the source cell) is greater than a second threshold (or the first network device determines that time for which the terminal device camps on the source cell is excessively long) and the terminal device successfully accesses the second cell (that is, the target cell), the first network device determines that the connection failure type of the terminal device is too late handover. The second cell is a candidate cell that is in at least one candidate cell of the terminal device and that satisfies a CHO trigger condition.

This embodiment of this application provides a criterion for determining too late handover in a CHO scenario. That is, when the first network device determines that the time for which the terminal device camps on the source cell is excessively long and the terminal device successfully accesses the target cell, the first network device determines that the connection failure type of the terminal device is too late handover. In this way, too late handover is determined when no RRC reestablishment is performed in the CHO scenario, and the mobility parameter is optimized, thereby implementing mobility robustness optimization.

With reference to the fourth aspect, in a possible implementation, the first cell is a source cell, the second cell is a target cell, and the second cell is a candidate cell that is in at least one candidate cell of the terminal device and that satisfies a CHO trigger condition. Before that the first network device receives the connection failure information, the method further includes: The first network device sends first indication information to the terminal device, where the first indication information is used to indicate the terminal device to access the first cell when the terminal device fails to be handed over from the first cell to the second cell. According to this embodiment of this application, in the CHO scenario, when random access to the target cell fails, a rollback to communication in the source cell can be performed.

With reference to the fourth aspect, in a possible implementation, the first cell is a source cell, the second cell is a target cell, the second cell is a candidate cell that is in at least one candidate cell of the terminal device and that satisfies a CHO trigger condition, and the connection failure information is used to indicate that the terminal device fails to be handed over from the first cell to the second cell (the target cell). That the first network device determines a connection failure type of the terminal device is specifically as follows: If the first network device determines that the terminal device continues to keep a wireless connection to the first cell (that is, the source cell) after the terminal device successfully re-accesses the first cell (or the first network device determines that the terminal device camps on the source cell), the first network device determines that the connection failure type of the terminal device is too early handover. If the first network device determines that a third cell is a cell to be accessed by the terminal device (or the first network device determines that the terminal device is handed over to a new target cell), the first network device determines that the connection failure type of the terminal device is handover to a wrong cell. The third cell is different from the first cell (that is, the source cell) and any one of the one or more candidate cells.

This embodiment of this application provides a criterion for determining too early handover and handover to a wrong cell in the CHO scenario. When the first network device determines that the terminal device camps on the source cell, the first network device determines that the connection failure type of the terminal device is too early handover. When the first network device determines that the terminal device is handed over to a new target cell, the first network device determines that the connection failure type of the terminal device is handover to a wrong cell. In this way, too early handover and handover to a wrong cell are determined when no RRC reestablishment is performed in the CHO scenario, and the mobility parameter is optimized, thereby implementing mobility robustness optimization.

According to a fifth aspect, an embodiment of this application provides an apparatus. The apparatus may be a network device or a chip or a circuit that may be disposed in the network device. The apparatus includes a unit and/or a module configured to perform the mobility optimization method according to any one of the first aspect and/or the possible implementations of the first aspect, and therefore, can also achieve beneficial effects (or advantages) of the mobility optimization method provided in the first aspect.

According to a sixth aspect, an embodiment of this application provides an apparatus. The apparatus may be a network device or a chip or a circuit that may be disposed in the network device. The apparatus includes a unit and/or a module configured to perform the mobility optimization method according to any one of the second aspect and/or the possible implementations of the second aspect, and therefore, can also achieve beneficial effects (or advantages) of the mobility optimization method provided in the second aspect.

According to a seventh aspect, an embodiment of this application provides an apparatus. The apparatus may be a network device or a chip or a circuit that may be disposed in the network device. The apparatus includes a unit and/or a module configured to perform the mobility optimization method according to any one of the third aspect and/or the possible implementations of the third aspect, and therefore, can also achieve beneficial effects (or advantages) of the mobility optimization method provided in the third aspect.

According to an eighth aspect, an embodiment of this application provides an apparatus. The apparatus may be a network device or a chip or a circuit that may be disposed in the network device. The apparatus includes a unit and/or a module configured to perform the mobility optimization method according to any one of the fourth aspect and/or the possible implementations of the fourth aspect, and therefore, can also achieve beneficial effects (or advantages) of the mobility optimization method provided in the fourth aspect.

According to a ninth aspect, an embodiment of this application provides an apparatus. The apparatus may be a network device or a chip or a circuit that may be disposed in the network device. The apparatus may include a processor, a transceiver, and a memory. The memory is configured to store a computer program, the transceiver is configured to receive and send various types of information, the computer program includes program instructions, and when the processor runs the program instructions, the apparatus is enabled to perform the mobility optimization method according to any one of the first aspect or the possible implementations of the first aspect. The transceiver may be a radio frequency module in the network device, or a combination of the radio frequency module and an antenna, or an input/output interface of the chip or the circuit.

According to a tenth aspect, an embodiment of this application provides an apparatus. The apparatus may be a network device or a chip or a circuit that may be disposed in the network device. The apparatus may include a processor, a transceiver, and a memory. The memory is configured to store a computer program, the transceiver is configured to receive and send various types of information, the computer program includes program instructions, and when the processor runs the program instructions, the apparatus is enabled to perform the mobility optimization method according to any one of the second aspect or the possible implementations of the second aspect. The transceiver may be a radio frequency module in the network device, or a combination of the radio frequency module and an antenna, or an input/output interface of the chip or the circuit.

According to an eleventh aspect, an embodiment of this application provides an apparatus. The apparatus may be a network device or a chip or a circuit that may be disposed in the network device. The apparatus may include a processor, a transceiver, and a memory. The memory is configured to store a computer program, the transceiver is configured to receive and send various types of information, the computer program includes program instructions, and when the processor runs the program instructions, the apparatus is enabled to perform the mobility optimization method according to any one of the third aspect or the possible implementations of the third aspect. The transceiver may be a radio frequency module in the network device, or a combination of the radio frequency module and an antenna, or an input/output interface of the chip or the circuit.

According to a twelfth aspect, an embodiment of this application provides an apparatus. The apparatus may be a network device or a chip or a circuit that may be disposed in the network device. The apparatus may include a processor, a transceiver, and a memory. The memory is configured to store a computer program, the transceiver is configured to receive and send various types of information, the computer program includes program instructions, and when the processor runs the program instructions, the apparatus is enabled to perform the mobility optimization method according to any one of the fourth aspect or the possible implementations of the fourth aspect. The transceiver may be a radio frequency module in the network device, or a combination of the radio frequency module and an antenna, or an input/output interface of the chip or the circuit.

According to a thirteenth aspect, an embodiment of this application provides a communications system, including a first network device and a terminal device. The first network device is the network device in the mobility optimization method described in the first aspect or the fourth aspect, and the terminal device is the terminal device in the mobility optimization method described in the first aspect or the fourth aspect.

According to a fourteenth aspect, an embodiment of this application provides a communications system, including a first network device, a second network device, and a terminal device. The first network device is the first network device in the mobility optimization method described in any one of the second aspect, the third aspect, or the possible implementations of the second aspect or the third aspect, the second network device is the second network device in the mobility optimization method described in any one of the second aspect, the third aspect, or the possible implementations of the second aspect or the third aspect, and the terminal device is the terminal device in the mobility optimization method described in any one of the second aspect, the third aspect, or the possible implementations of the second aspect or the third aspect.

According to a fifteenth aspect, an embodiment of this application provides a readable storage medium. The readable storage medium stores instructions, and when the instructions are run on a computer, the computer is enabled to perform the mobility optimization method described in any one of the first aspect or the possible implementations of the first aspect.

According to a sixteenth aspect, an embodiment of this application provides a readable storage medium. The readable storage medium stores instructions, and when the instructions are run on a computer, the computer is enabled to perform the mobility optimization method described in any one of the second aspect or the possible implementations of the second aspect.

According to a seventeenth aspect, an embodiment of this application provides a readable storage medium. The readable storage medium stores instructions, and when the instructions are run on a computer, the computer is enabled to perform the mobility optimization method described in any one of the third aspect or the possible implementations of the third aspect.

According to an eighteenth aspect, an embodiment of this application provides a readable storage medium. The readable storage medium stores instructions, and when the instructions are run on a computer, the computer is enabled to perform the mobility optimization method described in any one of the fourth aspect or the possible implementations of the fourth aspect.

According to a nineteenth aspect, an embodiment of this application provides a program product including instructions. When the program product runs, the mobility optimization method described in any one of the first aspect or the possible implementations of the first aspect is performed.

According to a twentieth aspect, an embodiment of this application provides a program product including instructions. When the program product runs, the mobility optimization method described in any one of the second aspect or the possible implementations of the second aspect is performed.

According to a twenty-first aspect, an embodiment of this application provides a program product including instructions. When the program product runs, the mobility optimization method described in any one of the third aspect or the possible implementations of the third aspect is performed.

According to a twenty-second aspect, an embodiment of this application provides a program product including instructions. When the program product runs, the mobility optimization method described in any one of the fourth aspect or the possible implementations of the fourth aspect is performed.

According to a twenty-third aspect, an embodiment of this application provides a chip, including a processor. The processor is configured to read and execute a program stored in a memory, to perform the mobility optimization method provided in one or more of the first aspect to the fourth aspect, or any one of the possible implementations of the first aspect, the second aspect, the third aspect, or the fourth aspect. Optionally, the chip further includes the memory, and the memory is connected to the processor by using a circuit or a wire. Further, optionally, the chip further includes a communications interface, and the processor is connected to the communications interface. The communications interface is configured to receive data and/or information that need/needs to be processed. The processor obtains the data and/or the information from the communications interface, processes the data and/or the information, and outputs a processing result through the communications interface. The communications interface may be an input/output interface.

Optionally, the processor and the memory may be physically independent units, or the memory may be integrated with the processor.

According to embodiments of this application, too late handover, too early handover, and handover to a wrong cell can be determined in mobility enhancement and/or MR-DC proposed by the 3GPP, and the mobility parameter can be optimized, thereby implementing mobility robustness optimization.

DETAILED DESCRIPTION OF ILLUSTRATIVE EMBODIMENTS

Figure 1A:
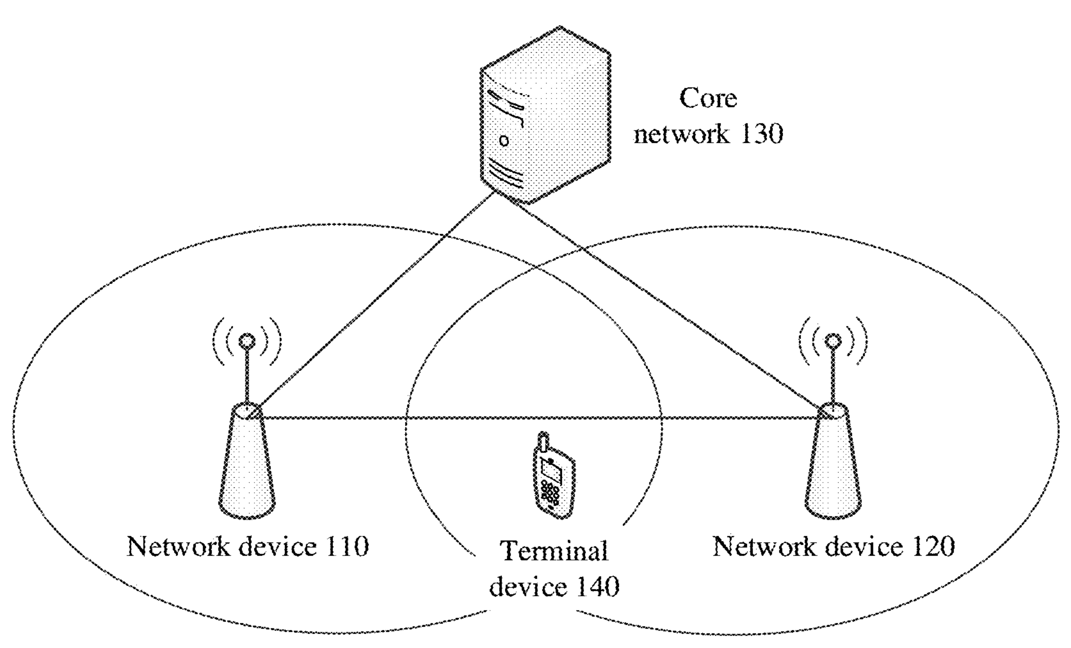
FIG. 1A is a schematic diagram of a system architecture of a mobile communications system according to an embodiment of this application.

The following clearly and completely describes the technical solutions in embodiments of this application with reference to the accompanying drawings in embodiments of this application.

To better understand a mobility optimization method provided in embodiments of this application, the following briefly describes some terms (nouns) in the mobility optimization method provided in embodiments of this application.

1. Radio Link Failure (RLF)

In long term evolution (LTE) for a universal mobile communications technology, when a terminal device finds that a problem occurs in communication with a network side, it is considered that a radio link failure occurs between a network device and the terminal device. A radio link failure detection mechanism includes one or more of the following: (1) A problem at a physical layer is detected. For example, an RRC layer of the terminal device receives N consecutive out-of-synchronization indications of a primary cell (PCell) from a lower layer, and does not receive M consecutive synchronization indications of the primary cell (PCell) from the lower layer in a later period of time. (2) A random access procedure performed in a master cell group fails. (3) The RRC layer of the terminal device receives, from a master cell group radio link control (RLC) layer, indication information indicating that a maximum quantity of retransmissions is reached.

2. Handover Failure

Inter-cell handover means that the terminal device completes, under control of a radio access network, migration of a radio link connection from a source cell to a target cell. Usually, after the terminal device receives a handover message (for example, an RRCReconfiguration message carrying reconfigurationWithSync), the terminal device starts a timer T304. When the terminal device successfully completes random access in the target cell, the terminal device stops the timer T304, indicating that the terminal device is successfully handed over from the source cell to the target cell. When the timer T304 expires before the terminal device successfully completes random access in the target cell, the terminal device fails to be handed over from the source cell to the target cell.

3. Too Late Handover (Too Late HO)

Too late handover means that a connection failure occurs after the terminal device is connected to a current serving cell for a period of time (for example, the RLF is detected in the current serving cell), and the terminal device attempts to reestablish a connection to another cell (where the another cell is any cell). This case mainly means that quality of the current serving cell deteriorates, but the terminal device receives no handover message; and therefore, after detecting the connection failure in the current serving cell, the terminal device attempts to reestablish the connection to the another cell.

4. Too Early Handover (Too Early HO)

Too early handover means that a connection failure occurs soon after the terminal device is successfully handed over from the source cell to the target cell (for example, the RLF is detected in the target cell), or a handover failure occurs in a procedure of handover from the source cell to the target cell, and the terminal device attempts to reestablish a connection to the source cell. The term "soon" herein may be understood as a short period of time.

5. Handover to a Wrong Cell (HO to Wrong Cell)

Handover to a wrong cell means that a connection failure occurs soon after the terminal device is successfully handed over from the source cell to the target cell (for example, the RLF is detected in the target cell), or a handover failure occurs in a procedure of handover from the source cell to the target cell, and the terminal device attempts to reestablish a connection to another cell (where the another cell is different from the source cell and the target cell). The term "soon" herein may be understood as a short period of time.

6. Master Cell Group (MCG) and Secondary Cell Group (SCG)

In a 5G wireless network, one terminal device may communicate with a plurality of network devices, that is, dual connectivity (DC), which is also referred to as multi-radio dual connectivity (MR-DC). The plurality of network devices may be network devices of a same standard (for example, the plurality of network devices are all 4th generation (4G) base stations, or are all 5th generation (5G) base stations), or may be base stations of different standards (for example, one base station is a 4G base station and another base station is a 5G base station). In DC, a network device (a base station) that exchanges control plane signaling with a core network (CN) is referred to as a master node (MN), and another network device (base station) is referred to as a secondary node (SN). The MN may be referred to as a master base station, and the SN may be referred to as a secondary base station. Cells served by the master base station are referred to as a master cell group, and the master cell group may include a primary cell (PCell) and one or more optional secondary cells. Cells served by the secondary base station are referred to as a secondary cell group, and the secondary cell group may include a primary secondary cell (primary SCG cell, PSCell) and one or more optional secondary cells.

7. Primary Cell (PCell) and Primary Secondary Cell (PSCell)

The primary cell is an MCG cell deployed at a primary frequency, and the terminal device performs an initial connection establishment procedure or a connection reestablishment procedure in the cell, or specifies the cell as the primary cell in a handover procedure. The primary secondary cell is a cell that is in an SCG cell and in which the terminal device performs random access when performing a synchronous reconfiguration procedure, or a cell in which the terminal device initiates initial physical uplink shared channel (PUSCH) transmission during an SCG change without requiring a random access procedure.

8. Mobility Robustness Optimization (MRO)

A main objective of the mobility robustness optimization is to reduce a quantity of handover-related RLFs and improve network resource usage efficiency. A non-optimal handover parameter configuration causes severe service performance deterioration even without causing the RLF, affecting user experience. For example, an incorrect setting of a handover hysteresis causes a ping-pong effect or delays access to a non-optimal cell, even without causing the RLF. Another objective of the mobility robustness optimization is to reduce inefficient use of network resources caused by unnecessary handover or missed handover. The mobility robustness optimization is mainly to adjust a handover threshold based on a feedback of a performance indicator, and adaptively adjust a cell parameter to adapt to the threshold.

The foregoing briefly describes some terms (nouns) in the mobility optimization method provided in embodiments of this application. The following describes a system architecture of the mobility optimization method provided in embodiments of this application.

The mobility optimization method provided in embodiments of this application may be applied to a mobile communications system, for example, a 2nd generation/3rd generation/4th generation mobile communications system (2G/3G/4G), or a 5G or future mobile communications system. For ease of understanding, a system architecture of the mobile communications system is first briefly described in embodiments of this application.

FIG. 1A is a schematic diagram of a system architecture of a mobile communications system according to an embodiment of this application. As shown in FIG. 1A, the mobile communications system may include at least two network devices (for example, a network device 110 and a network device 120 in FIG. 1A), at least one core network device 130, and at least one terminal device 140. The terminal device 140 may be wirelessly connected to the network device. The network device 110 and the network device 120 may jointly access the core network device 130. FIG. 1A is merely a schematic diagram. The mobile communications system may further include another network device, for example, may further include a wireless relay device and/or a wireless backhaul device, which are/is not shown in FIG. 1A. Quantities of network devices, terminal devices, and core network devices included in the mobile communications system are not limited in this embodiment of this application.

The core network device 130 may be a 4G core network device, or may be a 5G core network device.

The network device may be an entity, for example, a gNB, that is configured to transmit or receive a signal on a network side. The network device may alternatively be an access device that wirelessly connects the terminal device to the mobile communications system. For example, the network device may be a base station NodeB, an evolved base station (evolved NodeB, eNB), a transmission reception point (TRP), a next generation base station (next generation NodeB, gNB) in a 5G mobile communications system, or a base station in a future mobile communications system. A specific technology and a specific device form that are used by the network device are not limited in this embodiment of this application.

Figure 1B:
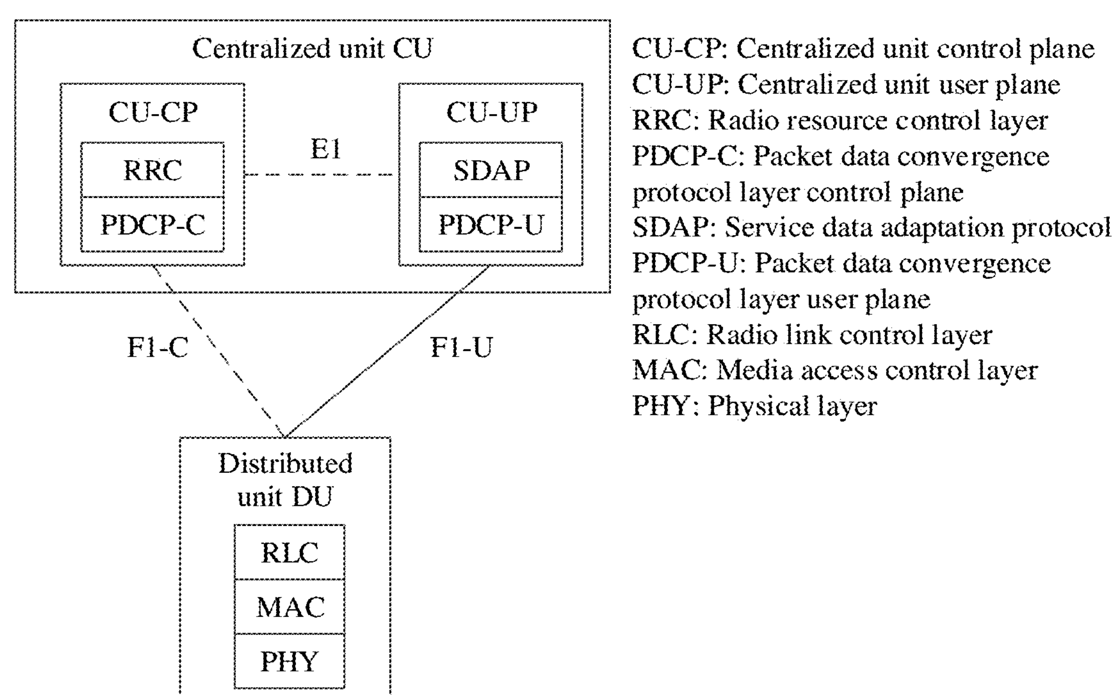
FIG. 1B is a schematic diagram of division of a base station in which a CU and a DU are split according to an embodiment of this application.

Optionally, the base station in this embodiment of this application may be a base station (which refers to a gNB herein) in which a centralized unit (CU) and a distributed unit (DU) are split. FIG. 1B is a schematic diagram of division of a base station in which a CU and a DU are split according to an embodiment of this application. One base station (which refers to a gNB herein) may include one CU and a plurality of DUs. The CU may be connected to the DU through an F1 interface. FIG. 1B shows only an example of a relationship between one CU and one DU. As shown in FIG. 1B, the CU may be divided into a centralized unit control plane (CU-control plane, CU-CP) and a centralized unit user plane (CU-user plane, CU-UP). The CU-CP and the CU-UP may be on different physical devices, and the CU-CP may be connected to the CU-UP through an E1 interface. The CU-CP may be connected to the DU through an F1-C interface, and the CU-UP may be connected to the DU through an F1-U interface. The CU-CP may include a radio resource control layer (RRC layer) and a packet data convergence protocol (PDCP) layer control plane. The CU-UP may include a service data adaptation protocol (SDAP) layer and a PDCP user plane. The DU may include a radio link control layer (RLC layer), a medium access control (MAC) layer, and a physical (PHY) layer.

The terminal device 140 may be an entity, for example, mobile phone UE, that is configured to receive or transmit a signal on a user side. The terminal device in this embodiment of this application may be a movable terminal device. For example, the terminal device may be a user terminal (UE), a mobile station (MS), or a mobile terminal (MT), or may be a mobile portable terminal device such as a mobile phone, a tablet computer (Pad), or a computer having a wireless transceiver function. A specific technology and a specific device form that are used by the movable terminal device are not limited in this embodiment of this application.

In some feasible implementations, the terminal device 140 may be connected to one or more network devices. For example, the terminal device 140 may communicate with the network device 110 and the network device 120 by using a dual connectivity (DC) technology. A dual connectivity (DC) type includes one or more of the following: evolved universal terrestrial radio access and new radio dual connectivity (E-UTRA-NR dual connectivity, EN-DC), next generation radio access network evolved universal terrestrial radio access new radio dual connectivity (NG-RAN E-UTRA-NR dual connectivity, NGEN-DC), new radio evolved universal terrestrial radio access dual connectivity (NR-E-UTRA dual connectivity, NE-DC), and new radio and new radio dual connectivity (NR-NR dual connectivity, NR-DC).

In EN-DC, a master base station (a master network device) is an LTE base station (for example, an eNB) connected to a 4G core network, and a secondary base station (a secondary network device) is an NR base station (for example, a gNB).

In NGEN-DC, a master base station (a master network device) is an LTE base station connected to a 5G core network, and a secondary base station (a secondary network device) is an NR base station.

In NE-DC, a master base station (a master network device) is an NR base station connected to a 5G core network, and a secondary base station (a secondary network device) is an LTE base station.

In NR-DC, a master base station (a master network device) is an NR base station connected to a 5G core network, and a secondary base station (a secondary network device) is an NR base station.

The foregoing describes the system architecture of the mobility optimization method provided in embodiments of this application. The following describes the mobility optimization method provided in embodiments of this application in detail with reference to an application scenario.

Application Scenario 1: Mobility Enhancement

To improve user experience and system performance, the 3GPP requires that a mobility interruption delay be 0 ms (millisecond) in a handover procedure (an uplink interruption delay and a downlink interruption delay both need to be 0 ms or close to 0 ms). Therefore, the 3GPP proposes a mobility enhancement solution to achieve the mobility interruption delay of 0 ms. In the mobility enhancement solution, a source base station sends a handover message (for example, an RRC Conn Reconfig with Mobility Control Info message) to a terminal device (for example, UE), and then may perform data forwarding with a target base station. In addition, the terminal device still keeps a connection to a source cell when synchronizing to a target cell. For a downlink, in a handover procedure, data transmission between the source base station and the terminal device is not interrupted, and both the target base station and the source base station may send downlink data to the terminal device, thereby reducing data transmission interruption time. Therefore, in the mobility enhancement solution, the terminal device may simultaneously perform data communication with the source base station and the target base station. Optionally, the mobility enhancement solution may also be applied to a scenario in which the source cell and the target cell belong to a same base station (that is, the source base station and the target base station are one physical entity), and a difference lies in that there is no data forwarding procedure between the source base station and the target base station. Optionally, the mobility enhancement solution may be referred to as dual active protocol stack (DAPS) handover.

In the mobility enhancement solution, the terminal device still keeps a wireless connection to the source cell (where keeping the wireless connection means that the terminal device can perform data communication in the source cell) in the handover procedure (where the handover procedure starts from time at which the source base station sends the handover message to time at which the source base station releases a context of the UE). Therefore, when the terminal device fails to access the target cell (which means that handover to the target cell fails or an RLF occurs soon after access to the target cell succeeds), the terminal device performs no RRC reestablishment, and the terminal device sends one piece of handover failure indication information to the source cell. Optionally, when the terminal device detects the RLF in the source cell after the terminal device receives the handover message and before a RACH procedure in the target cell succeeds, the terminal device also performs no RRC reestablishment. Therefore, RRC reestablishment is not triggered in the foregoing two cases. In this case, a network device on a network side does not perform mobility robustness optimization, and does not determine problems such as too late handover, too early handover, and handover to a wrong cell in the foregoing two cases.

For the application scenario 1 (the mobility enhancement scenario), embodiments of this application provide a mobility optimization method, to determine too late handover, too early handover, and handover to a wrong cell in the mobility enhancement scenario, and optimize a mobility parameter, thereby implementing mobility robustness optimization.

Figure 2:
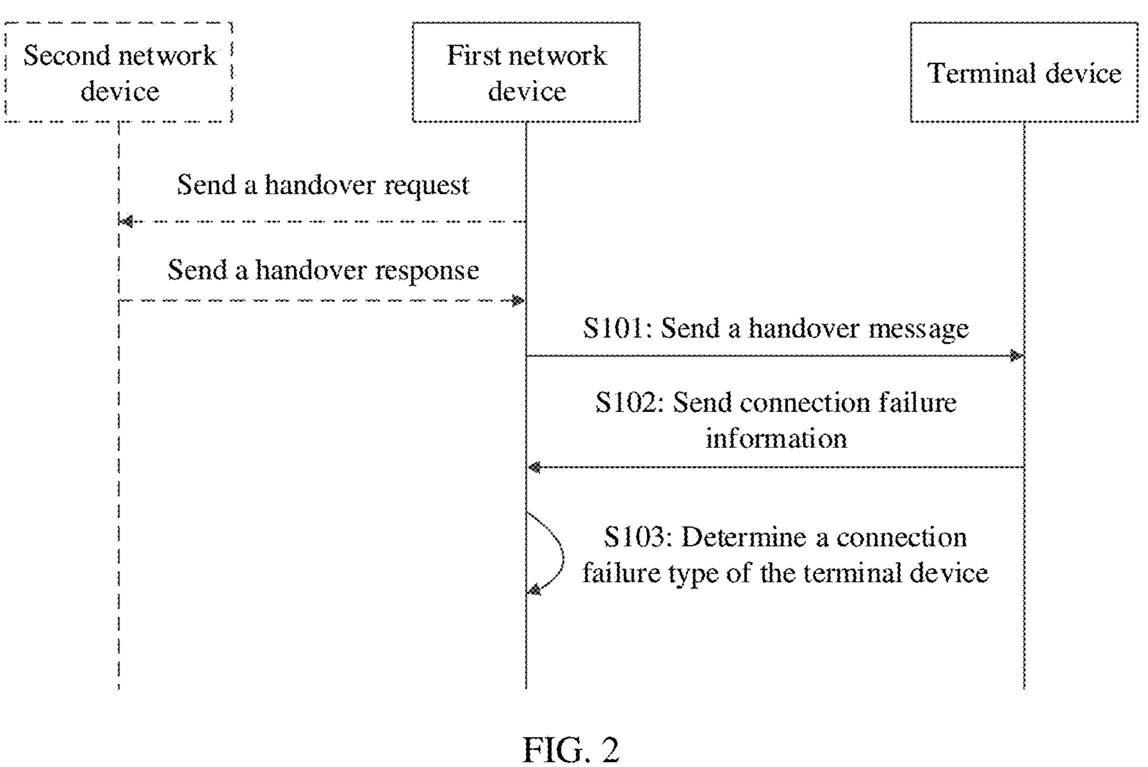
FIG. 2 is a first schematic flowchart of a mobility optimization method according to an embodiment of this application.

FIG. 2 is a first schematic flowchart of a mobility optimization method according to an embodiment of this application. As shown in FIG. 2, the mobility optimization method provided in this embodiment of this application includes but is not limited to the following steps.

S101: A first network device sends a handover message to a terminal device. Correspondingly, the terminal device receives the handover message.

In some feasible implementations, the first network device may be a source base station. The handover message may be an RRC message, for example, an RRC connection reconfiguration RRC Connection Reconfiguration message carrying mobility control information Mobility Control Info or an RRCConnectionReconfiguration message carrying reconfiguration with synchronization reconfigurationWith-Sync. The handover message may be used to trigger the terminal device to perform a procedure of handover from a source cell to a target cell. The handover procedure may include the following steps: (a) The terminal device synchronizes to the target cell but keeps a connection to the source cell (Synchronize to target cell but keep connection with source cell). (b) The target cell delivers an uplink allocation (UL allocation) and a timing advance for the terminal device (TA for UE). (c) The terminal device sends an RRC reconfiguration complete message (RRC Connection Reconfiguration Complete) to the target cell. (d) The terminal device distinguishes a PDCP packet from the source cell or the target cell (Distinguish PDCP packet from source or target cell). (e) The terminal device detaches from the source cell (detach from source cell). (f) The target cell sends a UE context release message to the source cell. (g) The source cell releases a resource (Release resources). Herein, in the handover procedure in which the terminal device is handed over from the source cell to the target cell, the terminal device still keeps the wireless connection to the source cell, that is, the terminal device can perform data communication in the source cell. In this embodiment of this application, the target cell is a first cell, and the source cell is a second cell. Optionally, the handover message may be a handover message delivered in DAPS handover.

Optionally, that the terminal device keeps a wireless connection to the source cell herein may be that the terminal device continues to receive downlink user data from the source cell until the terminal device releases the source cell, and the terminal device continues to perform uplink data transmission in the source cell until the terminal device successfully completes a random access procedure in the target cell. Optionally, new uplink data is no longer transmitted in the source cell, and it has been previously determined that uplink data sent by the terminal device to the source cell may still be retransmitted by the terminal device to the source cell.

In some feasible implementations, the source cell and the target cell may be cells managed by a same network device, that is, both the source cell and the target cell are cells managed by the first network device. The source cell and the target cell may alternatively be cells managed by different network devices. For example, the source cell is a cell managed by the first network device, and the target cell is a cell managed by a second network device. This is not limited in this embodiment of this application.

In some feasible implementations, if the source cell is a cell managed by the first network device and the target cell is a cell managed by the second network device, before the first network device sends the handover message to the terminal device, the first network device may send a handover request to the second network device, and after receiving the handover request, the second network device may feed back a corresponding handover response message (handover request ACK) to the first network device.

S102: The terminal device sends connection failure information to the first network device. Correspondingly, the first network device receives the connection failure information.

In some feasible implementations, the connection failure information may be used to indicate that the terminal device detects an RLF in the target cell (that is, the first cell) or fails to be handed over to the target cell. Optionally, the connection failure information may include signal quality of each cell (including the current target cell, the source cell, another neighboring cell, or the like) detected by the terminal device. Optionally, the connection failure information may be handover failure information. For example, a failure information failureInformation message carries DAPS handover failure information. Optionally, the connection failure information is sent to the first network device through a radio link between the terminal device and the first network device.

In some feasible implementations, the handover message may carry one piece of RRC reestablishment indication information. Alternatively, before the terminal device receives the handover message, the terminal device receives RRC reestablishment indication information delivered by the first network device. The RRC reestablishment indication information may be used to indicate whether the terminal device performs RRC reestablishment after the terminal device detects the RLF in the target cell or fails to be handed over to the target cell, or used to indicate that the terminal device performs no RRC reestablishment after the terminal device detects the RLF in the target cell or fails to be handed over to the target cell. Optionally, the RRC reestablishment indication information may be a condition for performing no RRC reestablishment after the terminal device detects the RLF in the target cell or fails to be handed over to the target cell, for example, when the signal quality of the source cell is greater than a threshold, the terminal device performs no RRC reestablishment. In this embodiment of this application, the terminal device sends the connection failure information to the first network device when performing no RRC reestablishment.

S103: The first network device determines a connection failure type of the terminal device.

In some feasible implementations, the connection failure type of the terminal device may include too early handover and handover to a wrong cell. After the first network device receives the connection failure information, the first network device may determine the connection failure type of the terminal device. Specifically, if the first network device determines that the terminal device still keeps the wireless connection to the source cell after the terminal device detects the RLF in the target cell or fails to be handed over to the target cell (that is, the first network device determines that the terminal device camps on the source cell), the first network device determines that the connection failure type of the terminal device is too early handover. If the first network device determines that a third cell is a cell to be accessed by the terminal device (that is, the first network device determines that the terminal device is handed over to a new target cell), the first network device determines that the connection failure type of the terminal device is handover to a wrong cell. The third cell is different from the source cell (that is, the second cell) and the target cell (that is, the first cell). For example, if the source cell is a cell A and the target cell is a cell B, the third cell may be a cell C. The connection failure type may be used for mobility robustness optimization. Optionally, after determining too early handover or handover to a wrong cell, the first network device may optimize a mobility parameter. The mobility parameter may include one or more of the following: a measurement filter coefficient, a corresponding measurement trigger threshold or periodicity, time to trigger (time to trigger), a hysteresis threshold, or the like.

In some feasible implementations, after determining that the terminal device still keeps the wireless connection to the source cell, the first network device may determine an absolute difference between sending time of the handover message and receiving time of the connection failure information. If the absolute difference is less than or equal to a first threshold (a configured threshold), the first network device determines that the connection failure type of the terminal device is too early handover. Optionally, the first network device determines an absolute difference between receiving time of the handover message reported by the terminal device and time at which the RLF is detected in the target cell (or handover to the target cell fails). If the absolute difference is less than or equal to a first threshold (a configured threshold), the first network device determines that the connection failure type of the terminal device is too early handover. Further, optionally, when the absolute difference is less than or equal to the first threshold and the first network device determines that a handover message has been recently delivered to the terminal device, the first network device determines that the connection failure type of the terminal device is too early handover.

In some other feasible implementations, after determining that a third cell is a cell to be accessed by the terminal device, the first network device may determine an absolute difference between sending time of the handover message and receiving time of the connection failure information. If the absolute difference is less than or equal to a first threshold (a configured threshold), the first network device determines that the connection failure type of the terminal device is handover to a wrong cell. Optionally, the first network device determines an absolute difference between receiving time of the handover message reported by the terminal device and time at which the RLF is detected in the target cell (or handover to the target cell fails). If the absolute difference is less than or equal to a first threshold (a configured threshold), the first network device determines that the connection failure type of the terminal device is too early handover. Further, optionally, when the absolute difference is less than or equal to the first threshold and the first network device determines that a handover message has been recently delivered to the terminal device, the first network device determines that the connection failure type of the terminal device is handover to a wrong cell.

In an optional implementation, the source cell is a cell managed by the first network device, and the target cell is a cell managed by the second network device. It may be understood that, the first network device is a source base station, and the second network device is a target base station. After receiving the connection failure information, the first network device may send the connection failure information to the second network device. Correspondingly, the second network device receives the connection failure information. The first network device may further send a determined subsequent behavior of the terminal device (for example, the first network device determines that the terminal device continues to keep the wireless connection to the source cell, or the first network device determines that the terminal device is handed over to a new target cell) to the second network device. The second network device determines the connection failure type of the terminal device.

Specifically, if the subsequent behavior of the terminal device that is received by the second network device is that the first network device determines that the terminal device continues to keep the wireless connection to the source cell (that is, determines that the terminal device camps on the source cell), the second network device determines that the connection failure type of the terminal device is too early handover. Optionally, if the subsequent behavior of the terminal device that is received by the second network device is keeping the wireless connection to the source cell, and the second network device sends a handover response message to the first network device within a period of time before the second network device receives the connection failure information (or the second network device learns that the terminal device is previously handed over from the source cell to the target cell), the second network device determines that the connection failure type of the terminal device is too early handover.

If the subsequent behavior of the terminal device that is received by the second network device is that the first network device determines that the terminal device is handed over to the new target cell, and the new target cell (for example, the cell C) is neither the source cell (for example, the cell A) nor the previous target cell (for example, the cell B), the second network device determines that the connection failure type of the terminal device is handover to a wrong cell. Optionally, if the subsequent behavior of the terminal device that is received by the second network device is handover to the new target cell, and the second network device sends a handover response message to the first network device within a period of time before the second network device receives the connection failure information (or the second network device learns that the terminal device is previously handed over from the source cell to the target cell), the second network device determines that the connection failure type of the terminal device is handover to a wrong cell.

It may be understood that, after the first network device sends the connection failure information to the second network device, the first network device may not perform step S103 in FIG. 2.

In some feasible implementations, after determining that the connection failure type of the terminal device is too early handover or handover to a wrong cell, the second network device may send indication information to the first network device, where the indication information may be used to indicate that the connection failure type of the terminal device is too early handover or handover to a wrong cell. After receiving the indication information, the first network device may optimize the mobility parameter.

In this embodiment of this application, after the terminal device detects the RLF in the target cell or fails to be handed over to the target cell, the terminal device sends the connection failure information to a network side, where the connection failure information is used to indicate that the terminal device detects the RLF in the target cell or fails to be handed over to the target cell. Correspondingly, a network device on the network side (which may be the first network device or may be the second network device) receives the connection failure information. The connection failure information may trigger the network device on the network side to determine the connection failure type (too early handover or handover to a wrong cell) of the terminal device. When determining that the terminal device camps on the source cell, the first network device determines that the connection failure type of the terminal device is too early handover; or when determining that the terminal device is handed over to the new target cell, the first network device determines that the connection failure type of the terminal device is handover to a wrong cell. After determining the connection failure type of the terminal device, the network device on the network side may optimize the mobility parameter. In this way, too early handover and handover to a wrong cell are determined in a mobility enhancement scenario, and the mobility parameter is optimized, thereby implementing mobility robustness optimization.

Figure 3:
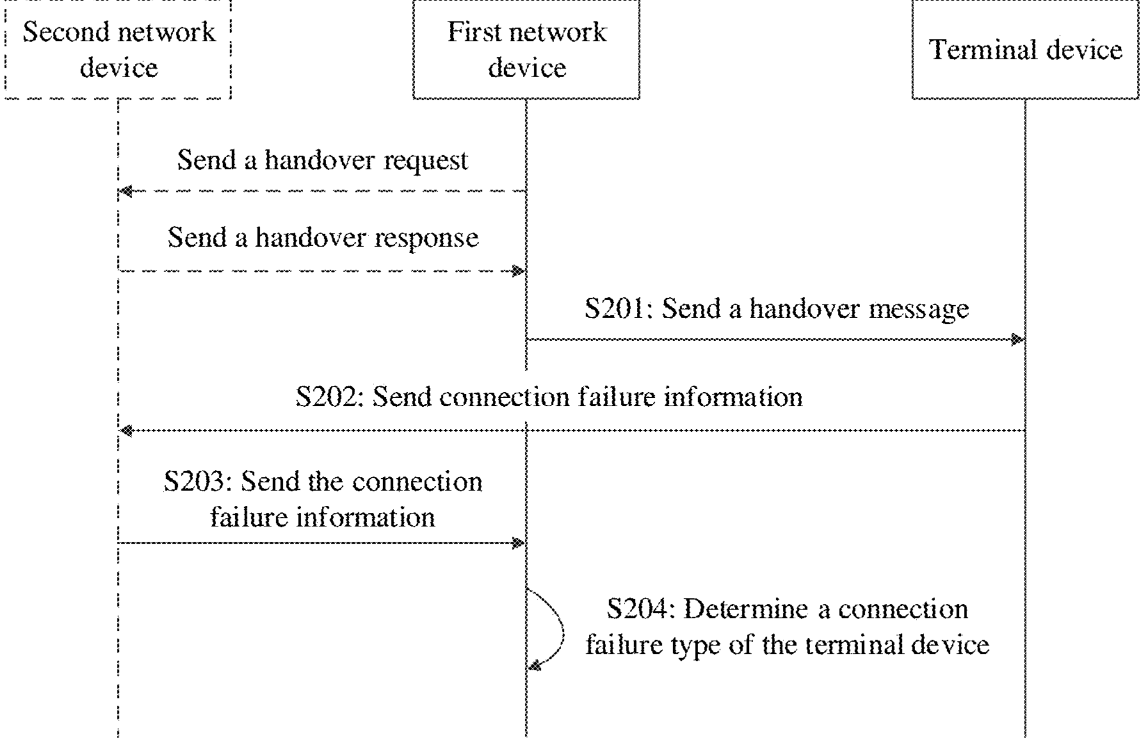
FIG. 3 is a second schematic flowchart of a mobility optimization method according to an embodiment of this application.

FIG. 3 is a second schematic flowchart of a mobility optimization method according to an embodiment of this application. As shown in FIG. 3, the mobility optimization method provided in this embodiment of this application includes but is not limited to the following steps.

S201: A first network device sends a handover message to a terminal device. Correspondingly, the terminal device receives the handover message.

In some feasible implementations, for an implementation of step S201 in this embodiment of this application, refer to the implementation of step S101 in the embodiment shown in FIG. 2. Details are not described herein again.

S202: The terminal device sends connection failure information to a second network device. Correspondingly, the second network device receives the connection failure information.

S203: The second network device sends the connection failure information to the first network device. Correspondingly, the first network device receives the connection failure information.

In some feasible implementations, the connection failure information may be used to indicate that the terminal device detects an RLF in a source cell in a procedure of handover from the source cell (that is, a first cell) to a target cell (that is, a second cell). In the handover procedure, before the terminal device detects the RLF in the source cell, the terminal device keeps a wireless connection to the source cell. When the terminal device detects the RLF in the source cell, the wireless connection between the terminal device and the source cell is broken, that is, the terminal device cannot perform data communication in the source cell in this case. Optionally, the connection failure information may include signal quality of each cell (including the current target cell, the source cell, another neighboring cell, or the like) detected by the terminal device. The connection failure information may be RLF indication information, for example, carried in a failure information failureInformation message. Optionally, the connection failure information is sent to the second network device through a radio link between the terminal device and the second network device.

It may be understood that, when the source cell and the target cell are cells managed by different network devices, the first network device may be a source base station, the source cell is a cell managed by the first network device, the second network device may be a target base station, and the target cell is a cell managed by the second network device. If the terminal device detects the RLF in the source cell in the procedure of handover from the source cell to the target cell, the terminal device may record the connection failure information for the source cell (that is, RLF information detected in the source cell). After the terminal device successfully performs a random access procedure in the target cell (that is, the terminal device is successfully handed over to the target cell to perform data communication), the terminal device may send the recorded connection failure information to the second network device. Correspondingly, the second network device receives the connection failure information. After receiving the connection failure information, the second network device may send the connection failure information to the first network device. Correspondingly, the first network device receives the connection failure information.

In some feasible implementations, a manner in which the terminal device records the connection failure information for the source cell may be as follows: The terminal device records only a latest RLF or failure of handover to the target cell, that is, each time an RLF or a failure of handover to the target cell is detected, only the currently detected RLF or failure of handover to the target cell is recorded and a previous record is overwritten. Optionally, a failure type carried in connection failure information reported by the terminal device to the second network device in a mobility enhancement scenario may indicate an RLF in the source cell in a handover procedure in mobility enhancement. Alternatively, the terminal device separately and independently reports RLFs, that is, in a handover procedure in mobility enhancement, an RLF detected in the source cell and another detected RLF record are independently reported, and do not overwrite each other.

It may be further understood that, when the source cell and the target cell are cells managed by a same network device, the first network device may be a source base station, both the source cell and the target cell are cells managed by the first network device, and the first network device and the second network device are a same physical device. If the terminal device detects the RLF in the source cell in the procedure of handover from the source cell to the target cell, the terminal device may record the connection failure information for the source cell (that is, RLF information detected in the source cell). After the terminal device successfully performs a random access procedure in the target cell (that is, the terminal device is successfully handed over to the target cell to perform data communication), the terminal device may send the recorded connection failure information to the first network device.

S204: The first network device determines a connection failure type of the terminal device.

In some feasible implementations, the connection failure type may include too late handover. Specifically, if the first network device determines that time for which the terminal device camps on the source cell is greater than a second threshold (that is, the first network device determines that the time for which the terminal device camps on the source cell is excessively long) and the terminal device successfully accesses the target cell, the first network device determines that the connection failure type of the terminal device is too late handover. The connection failure type may be used for mobility robustness optimization. Optionally, after determining too late handover, the first network device may optimize a mobility parameter. The mobility parameter may include one or more of the following: a measurement filter coefficient, a corresponding measurement trigger threshold or periodicity, time to trigger, a hysteresis threshold, or the like. The second threshold may be determined based on time for which signal quality of the source cell that is detected by the terminal device before the terminal device receives the handover message is lower than signal quality of another cell (which may be the target cell or another neighboring cell during the handover).

In this application, the time for which the terminal device camps on the source cell is time for which the terminal device keeps an RRC connection to the source cell, or time for which the terminal device keeps the wireless connection to the source cell, or time for which the terminal device has a connection to the source cell but does not receive a handover command. Time for camping on a specific cell in other parts of this application has a same meaning. Details are not described again.

In this embodiment of this application, after detecting the RLF in the source cell in the procedure of handover from the source cell to the target cell, the terminal device records the RLF information (that is, the connection failure information) detected in the source cell. After the terminal device successfully accesses the target cell, the terminal device sends the recorded connection failure information to the second network device, where the connection failure information is used to indicate that the terminal device detects the RLF in the source cell in the procedure of handover from the source cell to the target cell. After receiving the connection failure information, the second network device forwards the connection failure information to the first network device. The connection failure information may trigger the first network device to determine the connection failure type (too late handover) of the terminal device. If the first network device determines that the time for which the terminal device camps on the source cell is excessively long and the terminal device successfully accesses the target cell, the first network device determines that the connection failure type of the terminal device is too late handover. After determining the connection failure type of the terminal device, the first network device may optimize the mobility parameter. Optionally, the second network device may determine the connection failure type. For example, if the second network device sends a handover response message to the first network device within a period of time before the second network device receives the connection failure information (or the second network device learns that the terminal device is previously handed over from the source cell to the target cell), the second network device determines that the connection failure type of the terminal device is too late handover. In this way, too late handover is determined in the mobility enhancement scenario, and the mobility parameter is optimized, thereby implementing mobility robustness optimization.

Scenario 2: Dual Connectivity

In MR-DC enhancement in Release R16, a terminal device is simultaneously connected to two network devices, which are also referred to as nodes (an MN and an SN). When the terminal device detects an RLF in an MCG (a master cell group managed by the MN), the terminal device may send one piece of MCG failure information to the MN by using the SN. Specifically, the terminal device first sends the MCG failure information to the SN, and then the SN forwards the MCG failure information to the MN. Optionally, the MCG failure information may be carried by using an RRC message of the SN, for example, a signaling radio bearer 3 (SRB3). The SRB3 is a direct SRB between the terminal device and the SN. Alternatively, the MCG failure information may be sent by using a branch of an SRB of the MCG on an SN side, for example, a split signaling radio bearer 1 (split SRB1). The split SRB is an SRB between the MN and the terminal device, and the SRB has an RLC bearer in each of the MCG and an SCG (a secondary cell group).

The terminal device still has a wireless connection to the SCG when the terminal device detects the RLF in the MCG. Therefore, when the terminal device detects the RLF in the MCG, RRC reestablishment is not triggered. When the RLF in the MCG is detected in the dual connectivity scenario, mobility robustness optimization is not performed on a network side, and too late handover, too early handover, and handover to a wrong cell are not determined.

For the application scenario 2 (the RLF in the MCG in the dual connectivity scenario), embodiments of this application provide a mobility optimization method, to determine too late handover, too early handover, and handover to a wrong cell after the RLF in the MCG is detected, and optimize a mobility parameter, thereby implementing mobility robustness optimization.

Figures 4, 5:
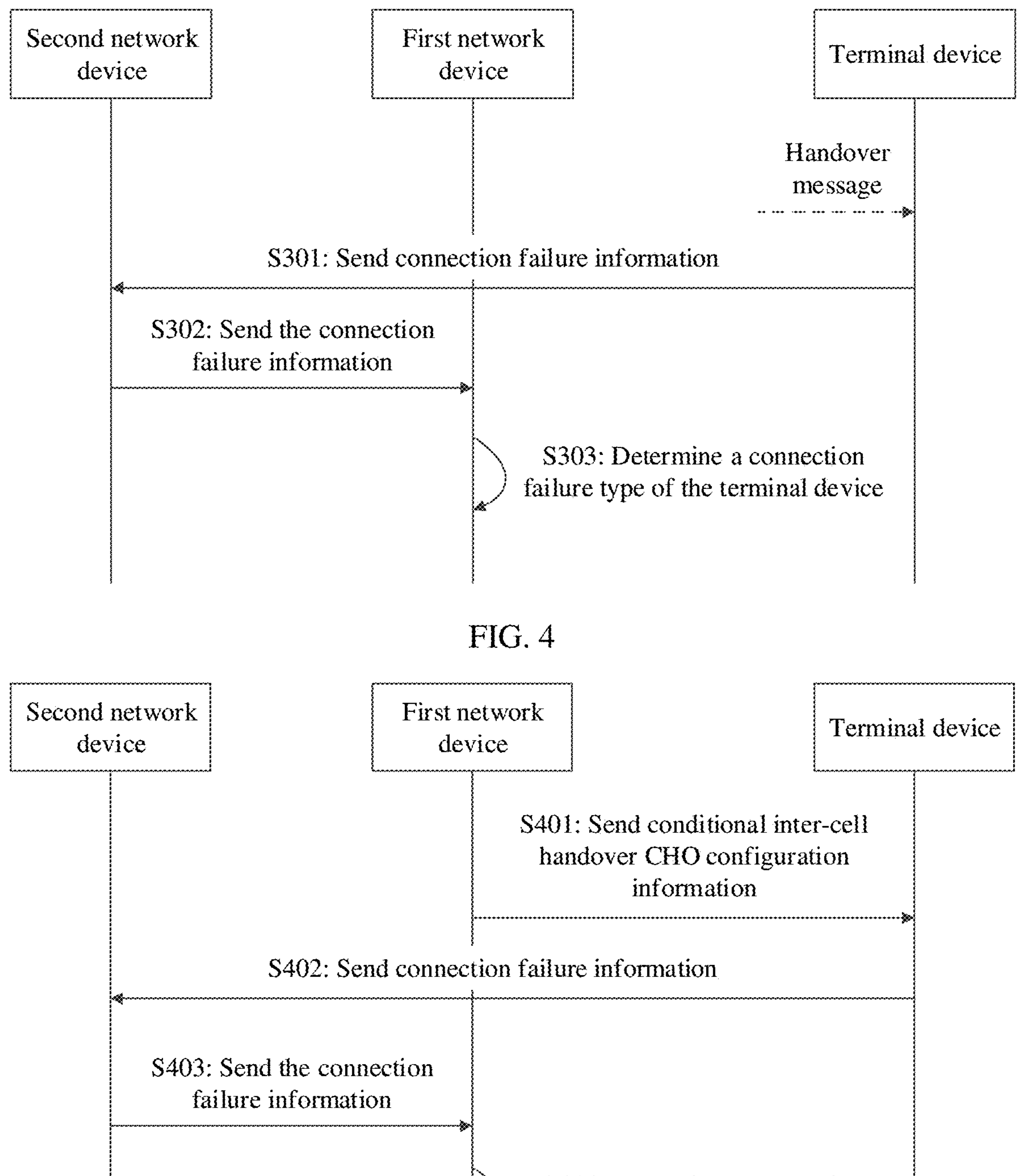
FIG. 4 is a third schematic flowchart of a mobility optimization method according to an embodiment of this application.
FIG. 5 is a fourth schematic flowchart of a mobility optimization method according to an embodiment of this application.

FIG. 4 is a third schematic flowchart of a mobility optimization method according to an embodiment of this application. As shown in FIG. 4, the mobility optimization method provided in this embodiment of this application includes but is not limited to the following steps.

S301: A terminal device sends connection failure information to a second network device. Correspondingly, the second network device receives the connection failure information.

S302: The second network device sends the connection failure information to a first network device. Correspondingly, the first network device receives the connection failure information.

In some feasible implementations, the connection failure information may be used to indicate that the terminal device detects an RLF in an MCG managed by the first network device.

In some feasible implementations, a network device (for example, a master network device of the terminal device, for example, the first network device, or a network device that is connected before UE is handed over to the first network device) may send configuration information for fast MCG failure recovery to the terminal device. After the terminal device receives the configuration information for fast MCG failure recovery, when the terminal device detects the RLF in the MCG, the terminal device may perform fast MCG failure recovery, for example, the terminal device performs fast MCG failure recovery by using the second network device (that is, a secondary network device SN). Specifically, the terminal device may send the connection failure information to the second network device. Correspondingly, the second network device receives the connection failure information. After receiving the connection failure information, the second network device may forward the connection failure information to the first network device. Correspondingly, the first network device receives the connection failure information.

S303: The first network device determines a connection failure type of the terminal device.

In some feasible implementations, the first network device is a source master network device, that is, a source MN, and the second network device is a secondary network device SN. The connection failure type includes too late handover. After receiving the connection failure information, the first network device may determine whether the connection failure type of the terminal device is too late handover. Specifically, if the first network device determines that a fourth cell is a cell to be accessed by the terminal device (that is, the first network device determines that a primary cell PCell of the terminal device changes to a new cell, where the new cell is different from the primary cell in the MCG managed by the first network device, for example, the primary cell PCell of the terminal device changes from a cell A to a cell D), the first network device determines that the connection failure type of the terminal device is too late handover. The fourth cell is different from the primary cell in the MCG managed by the first network device. For example, the primary cell in the MCG managed by the first network device is the cell A, and the fourth cell may be the cell D. Optionally, the fourth cell may be a secondary cell SCell managed by the first network device. Optionally, after determining too late handover, the first network device may optimize a mobility parameter. The mobility parameter may include one or more of the following: a measurement filter coefficient, a corresponding measurement trigger threshold or periodicity, time to trigger, a hysteresis threshold, or the like.

Optionally, if the first network device determines that the fourth cell is a cell to be accessed by the terminal device and time for which the terminal device camps on the primary cell in the MCG managed by the first network device is greater than a third threshold (that is, the first network device determines that the time for which the terminal device camps on the primary cell in the MCG managed by the first network device is excessively long), the first network device determines that the connection failure type of the terminal device is too late handover.

Optionally, if the first network device determines that the fourth cell is a cell to be accessed by the terminal device and the first network device sends no handover message to the terminal device within a period of time before the connection failure information is received, the first network device determines that the connection failure type of the terminal device is too late handover.

In some feasible implementations, the first network device is a target master network device, that is, a target MN, and the second network device is a secondary network device SN. The connection failure type may include too early handover or handover to a wrong cell. After receiving the connection failure information, the first network device may determine the connection failure type of the terminal device. Specifically, if the first network device determines that a source master network device (for example, the first network device or a network device that is connected before UE is handed over to the first network device) has recently sent, to the terminal device, a handover message used to indicate that a primary cell changes (for example, the primary cell changes from a cell A to a cell B) and determines that a fifth cell (for example, the cell A) is a cell to be accessed by the terminal device (that is, determines that the terminal device camps on the primary cell that is not changed, for example, the cell A), the first network device determines that the connection failure type of the terminal device is too early handover. The fifth cell is a cell that is accessed before the primary cell in the MCG managed by the first network device is handed over to. For example, the fifth cell is the cell A, the primary cell in the MCG managed by the first network device is the cell B, and the handover message is used to indicate that the primary cell of the terminal device changes from the cell A to the cell B.

If the first network device (that is, the target master network device) determines that the source master network device (for example, the first network device or a network device that is connected before UE is handed over to the first network device) has recently sent, to the terminal device, a handover message used to indicate that a primary cell changes (for example, the primary cell changes from a cell A to a cell B) and determines that a sixth cell (for example, a cell C) is a cell to be accessed by the terminal device (that is, determines that the terminal device is handed over to a new primary cell, where the new primary cell is different from the cells A and B), the first network device determines that the connection failure type of the terminal device is handover to a wrong cell. The sixth cell is different from the primary cell in the MCG managed by the first network device and the fifth cell. For example, the fifth cell is the cell A, the primary cell in the MCG managed by the first network device is the cell B, the sixth cell may be a cell C, and the handover message is used to indicate that the primary cell of the terminal device changes from the cell A to the cell B.

The fifth cell (for example, the cell A) and the primary cell (for example, the cell B) in the MCG managed by the first network device may be cells managed by a same master network device (MN), that is, the source master network device and the first network device are a same physical device. The fifth cell (for example, the cell A) and the primary cell (for example, the cell B) in the MCG managed by the first network device may alternatively be cells managed by different master network devices (MNs), that is, the source master network device and the first network device are different physical devices, and the fifth cell is a cell managed by the source master network device or a primary cell managed by the source master network device.

In some feasible implementations, if the source master network device and the first network device are different physical devices, and the first network device is a target master network device, after determining that the connection failure type of the terminal device is too early handover or handover to a wrong cell, the first network device may send second indication information to the source master network device, where the second indication information may be used to indicate that the connection failure type of the terminal device is too early handover or handover to a wrong cell. Optionally, after determining that the received connection failure type is too early handover or handover to a wrong cell, the source master network device may optimize a mobility parameter. The mobility parameter may include one or more of the following: a measurement filter coefficient, a corresponding measurement trigger threshold or periodicity, time to trigger, a hysteresis threshold, or the like.

In this embodiment of this application, after detecting the RLF in the MCG, the terminal device sends the connection failure information to the secondary network device (the second network device), and the secondary network device forwards the connection failure information to the first network device (which may be the source master network device or may be the target master network device), where the connection failure information is used to indicate that the terminal device detects the RLF in the MCG. The connection failure information may trigger the first network device to determine the connection failure type (too late handover, too early handover, or handover to a wrong cell) of the terminal device. When the first network device determines that the primary cell PCell of the terminal device changes to a new cell, the first network device determines that the connection failure type of the terminal device is too late handover. When the first network device determines that the source master network device has recently sent, to the terminal device, a handover message used to indicate that the primary cell changes and determines that the terminal device camps on the primary cell that is not changed, the first network device determines that the connection failure type of the terminal device is too early handover. When the first network device determines that the source master network device has recently sent, to the terminal device, a handover message used to indicate that the primary cell changes and determines that the terminal device is handed over to a new primary cell, the first network device determines that the connection failure type of the terminal device is handover to a wrong cell. After the connection failure type of the terminal device is determined on a network side, the mobility parameter may be optimized. In this way, too late handover, too early handover, and handover to a wrong cell are determined in a dual connectivity scenario, and the mobility parameter is optimized, thereby implementing mobility robustness optimization.

Scenario 3: Conditional Handover (CHO)

In CHO, a network device corresponding to a source cell sends CHO configuration information to a terminal device when quality of a source link is good. The CHO configuration information may include a CHO trigger condition and information about one or more candidate cells. The information about the candidate cell may include an identifier of the candidate cell and frequency information corresponding to the candidate cell. The identifier of the candidate cell may be a cell global identifier (CGI) of the candidate cell or a physical cell identifier (PCI) of the candidate cell. After receiving the CHO configuration information, the terminal device determines, based on the CHO configuration information, whether the one or more candidate cells satisfy the CHO trigger condition, and uses a specific candidate cell that satisfies the CHO trigger condition as a target cell. Then, the terminal device performs a random access procedure in the determined target cell. When successfully performing random access in the target cell, the terminal device sends an RRC message (for example, an RRC reconfiguration complete message) to the target cell, to notify that conditional handover to the target cell is completed.

Therefore, in the CHO scenario, if a specific candidate cell satisfies the CHO trigger condition, the terminal device directly accesses the candidate cell that satisfies the CHO trigger condition, and does not need to perform RRC reestablishment. In this case, mobility robustness optimization is not performed on a network side, and too late handover, too early handover, and handover to a wrong cell are not determined.

For the application scenario 3 (no RRC reestablishment is performed in the conditional scenario), embodiments of this application provide a mobility optimization method, to determine too late handover, too early handover, and handover to a wrong cell when no RRC reestablishment is performed in a conditional inter-cell handover scenario, and optimize a mobility parameter, thereby implementing mobility robustness optimization.

FIG. 5 is a fourth schematic flowchart of a mobility optimization method according to an embodiment of this application. As shown in FIG. 5, the mobility optimization method provided in this embodiment of this application includes but is not limited to the following steps.

S401: A first network device sends CHO configuration information to a terminal device. Correspondingly, the terminal device receives the CHO configuration information.

In some feasible implementations, the CHO configuration information may include a CHO trigger condition and information about one or more candidate cells. The information about the candidate cell may include an identifier of the candidate cell and frequency information corresponding to the candidate cell. The identifier of the candidate cell may be a CGI or a PCI.

S402: The terminal device sends connection failure information to a second network device. Correspondingly, the second network device receives the connection failure information.

S403: The second network device sends the connection failure information to the first network device. Correspondingly, the first network device receives the connection failure information.

In some feasible implementations, the connection failure information may be used to indicate that the terminal device detects an RLF in a source cell. It may be understood that, the first network device is a source base station, and the second network device is a target base station. The source cell is a cell managed by the first network device. A target cell is a cell managed by the second network device. In this embodiment of this application, the source cell is a first cell, and the target cell is a second cell. The target cell is a candidate cell that is in the one or more candidate cells and that satisfies the CHO trigger condition or a first condition. Alternatively, the target cell is a cell obtained through cell reselection by the terminal device.

In some feasible implementations, when detecting the RLF in the source cell, the terminal device may record RLF information (that is, the connection failure information) detected in the source cell, and may detect signal quality of each of the one or more candidate cells. When detecting that signal quality of a candidate cell i in the candidate cells satisfies the CHO trigger condition or satisfies the first condition, the terminal device may perform random access in the candidate cell i. For example, the CHO trigger condition or the first condition is that signal quality is higher than a threshold. In this case, when the signal quality of the candidate cell i is higher than the threshold, the terminal device performs random access in the candidate cell i. The candidate cell i may be referred to as a target cell. The target cell may be a cell managed by the second network device. After the terminal device successfully performs random access in the target cell (that is, the candidate cell i), the terminal device may send the connection failure information to the second network device. Correspondingly, the second network device receives the connection failure information. After receiving the connection failure information, the second network device may forward the connection failure information to the first network device. Correspondingly, the first network device receives the connection failure information. Optionally, the first condition may be carried in the CHO configuration information.

In some feasible implementations, when detecting the RLF in the source cell, the terminal device may record RLF information (that is, the connection failure information) detected in the source cell, and may start a timer and simultaneously detect signal quality of each of the one or more candidate cells. After the timer expires, if the terminal device does not detect that signal quality of any candidate cell satisfies the CHO trigger condition or the first condition, the terminal device may perform cell reselection. If a cell obtained through cell reselection by the terminal device is a candidate cell j in the one or more candidate cells, the terminal device performs random access in the candidate cell j obtained through cell reselection. The candidate cell j may be referred to as a target cell. The target cell may be a cell managed by the second network device. After the terminal device successfully performs random access in the target cell (that is, the candidate cell j), the terminal device may send the connection failure information to the second network device. Correspondingly, the second network device receives the connection failure information. After receiving the connection failure information, the second network device may forward the connection failure information to the first network device. Correspondingly, the first network device receives the connection failure information.

S404: The first network device determines a connection failure type of the terminal device.

In some feasible implementations, the connection failure type of the terminal device may include too late handover. Specifically, if the first network device determines that time for which the terminal device camps on the source cell is greater than a second threshold (that is, the first network device determines that the time for which the terminal device camps on the source cell is excessively long) and the terminal device successfully accesses the target cell, the first network device determines that the connection failure type of the terminal device is too late handover. The connection failure type may be used for mobility robustness optimization. Optionally, after determining too late handover, the first network device may optimize a mobility parameter. The mobility parameter may include one or more of the following: a measurement filter coefficient, a corresponding measurement trigger threshold or periodicity, time to trigger, a hysteresis threshold, or the like.

In this embodiment of this application, after detecting the RLF in the source cell, the terminal device records the RLF information (that is, the connection failure information) detected in the source cell. After the terminal device successfully accesses the target cell (a candidate cell that satisfies the CHO trigger condition), the terminal device sends the recorded connection failure information to the second network device, and the second network device forwards the connection failure information to the first network device. The connection failure information is used to indicate that the terminal device detects the RLF in the source cell. The connection failure information may trigger the first network device to determine the connection failure type (too late handover) of the terminal device. If the first network device determines that the time for which the terminal device camps on the source cell is excessively long and the terminal device successfully accesses the target cell, the first network device determines that the connection failure type of the terminal device is too late handover. After determining the connection failure type of the terminal device, the first network device may optimize the mobility parameter. In this way, too late handover is determined when no RRC reestablishment is performed in a CHO scenario, and the mobility parameter is optimized, thereby implementing mobility robustness optimization.

Figure 6:
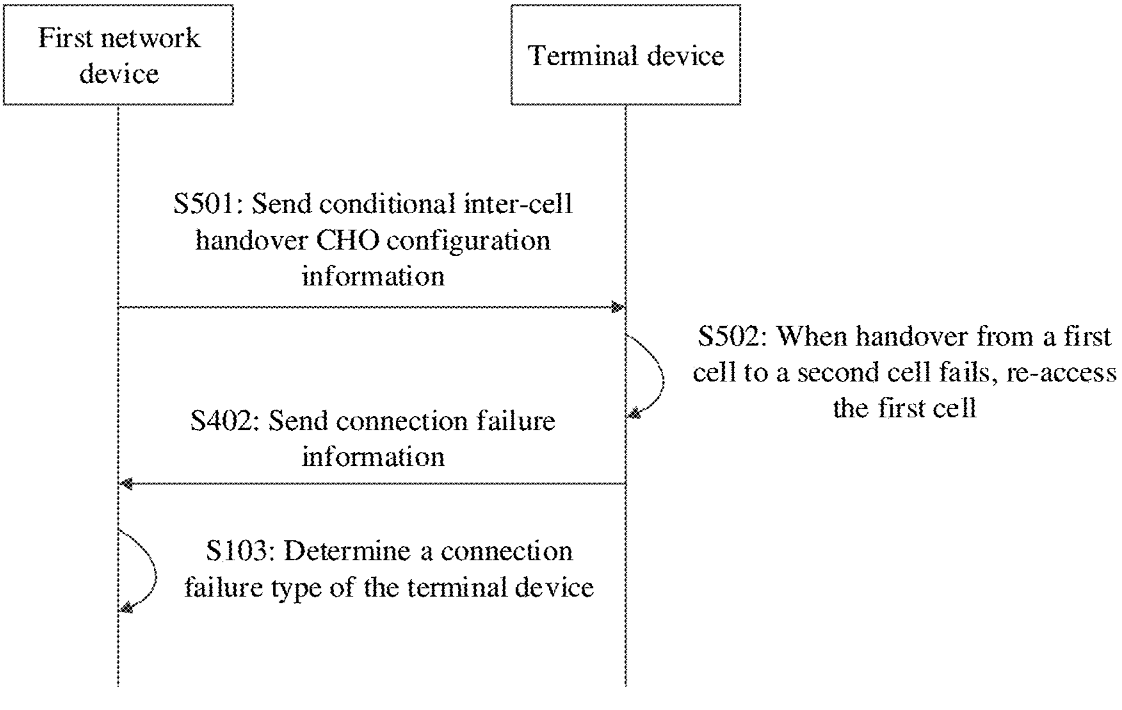
FIG. 6 is a fifth schematic flowchart of a mobility optimization method according to an embodiment of this application.

FIG. 6 is a fifth schematic flowchart of a mobility optimization method according to an embodiment of this application. As shown in FIG. 6, the mobility optimization method provided in this embodiment of this application includes but is not limited to the following steps.

S501: A first network device sends CHO configuration information to a terminal device. Correspondingly, the terminal device receives the CHO configuration information.

In some feasible implementations, for an implementation of step S501 in this embodiment of this application, refer to the implementation of step S401 in the embodiment shown in FIG. 5. Details are not described herein again.

S502: When the terminal device fails to be handed over from a first cell to a second cell, the terminal device re-accesses the first cell.

In some feasible implementations, the first cell is a source cell, and the second cell is a target cell. When the terminal device detects that a candidate cell i in one or more candidate cells satisfies a CHO trigger condition, the terminal device performs random access in the candidate cell i. The candidate cell i may be referred to as a target cell. The terminal device has a wireless connection to the source cell in a random access procedure in the target cell (the candidate cell i) (a procedure of handover to the target cell). Having the wireless connection herein means that the terminal device keeps a connection configuration in the source cell, but the terminal device cannot perform data communication in the source cell. When the terminal device fails to perform random access in the target cell (the candidate cell i) (that is, fails to be handed over to the target cell), the terminal device performs a rollback to data communication in the source cell, that is, the terminal device re-accesses the source cell. Optionally, the terminal device may record random access failure information in the target cell.

In some feasible implementations, before the terminal device detects that the candidate cell i in the candidate cells satisfies the CHO trigger condition, the terminal device may receive first indication information sent by the first network device. The first indication information may be used to indicate the terminal device to access the source cell (that is, perform a rollback to data communication in the source cell) after the terminal device fails to perform random access in the target cell (that is, fails to be handed over to the target cell). Optionally, the first indication information may be used to indicate a rollback condition. When the terminal device detects, after the terminal device fails to perform random access in the target cell, that signal quality of the source cell satisfies the rollback condition, the terminal device re-accesses the source cell. For example, the rollback condition may be that signal quality is higher than a threshold. That is, when the terminal device detects, after the terminal device fails to perform random access in the target cell, that the signal quality of the source cell is higher than the threshold, the terminal device re-accesses the source cell.

S503: The terminal device sends connection failure information to the first network device. Correspondingly, the first network device receives the connection failure information.

In some feasible implementations, the connection failure information may be used to indicate that the terminal device fails to be handed over to the target cell (that is, fails to perform random access in the target cell). It may be understood that, the random access failure information in the target cell is the connection failure information. The first network device is a source base station. The source cell is a cell managed by the first network device.

S504: The first network device determines a connection failure type of the terminal device.

In some feasible implementations, the connection failure type may include too early handover or handover to a wrong cell. After the first network device receives the connection failure information, the first network device may determine the connection failure type of the terminal device. Specifically, if the first network device determines that the terminal device continues to keep the wireless connection to the source cell (that is, the second cell) after the terminal device successfully re-accesses the source cell (that is, the first network device determines that the terminal device camps on the source cell), the first network device determines that the connection failure type of the terminal device is too early handover. If the first network device determines that a third cell is a cell to be accessed by the terminal device (that is, the first network device determines that the terminal device is handed over to a new target cell), the first network device determines that the connection failure type of the terminal device is handover to a wrong cell. The third cell is different from the source cell (that is, the first cell) and any one of the one or more candidate cells. The connection failure type may be used for mobility robustness optimization. Optionally, after determining too early handover or handover to a wrong cell, the first network device may optimize a mobility parameter. The mobility parameter may include one or more of the following: a measurement filter coefficient, a corresponding measurement trigger threshold or periodicity, time to trigger, a hysteresis threshold, or the like.

In some feasible implementations, after determining that the terminal device continues to keep the wireless connection to the source cell after the terminal device successfully re-accesses the source cell, the first network device may determine an absolute difference between sending time of the CHO configuration information and receiving time of the connection failure information. If the absolute difference is less than or equal to a configured threshold, the first network device determines that the connection failure type of the terminal device is too early handover. Optionally, the absolute difference may alternatively be an absolute difference between receiving time of the CHO configuration information reported by the terminal device and time at which handover to the target cell fails (that is, random access in the target cell fails). Further, optionally, when the absolute difference is less than or equal to the configured threshold and the first network device determines that the CHO configuration information has been recently delivered to the terminal device, the first network device determines that the connection failure type of the terminal device is too early handover.

In some other feasible implementations, after determining that a third cell is a cell to be accessed by the terminal device, the first network device may determine an absolute difference between sending time of the CHO configuration information and receiving time of the connection failure information. If the absolute difference is less than or equal to a configured threshold, the first network device determines that the connection failure type of the terminal device is handover to a wrong cell. Optionally, the absolute difference may alternatively be an absolute difference between receiving time of the CHO configuration information reported by the terminal device and time at which handover to the target cell fails (that is, random access in the target cell fails). Further, optionally, when the absolute difference is less than or equal to the configured threshold and the first network device determines that the CHO configuration information has been recently delivered to the terminal device, the first network device determines that the connection failure type of the terminal device is handover to a wrong cell.

In an optional embodiment, step S502 may be replaced with step S502': When the terminal device fails to be handed over from the first cell to the second cell, the terminal device determines signal quality of another cell, and selects a cell from the another cell for access. For example, the terminal device determines signal quality of another candidate cell and/or the first cell, and if signal quality of a specific cell is higher than a threshold, the terminal device accesses the cell. Optionally, the threshold is carried in the CHO configuration information.

It may be understood that, step S503 may alternatively be replaced with step S503': The terminal device sends the connection failure information to a third network device corresponding to the successfully accessed cell. Correspondingly, the third network device receives the connection failure information. If the successfully accessed cell is the first cell, the connection failure type of the terminal device is determined according to the method in step S504.

In this embodiment of this application, after the terminal device fails to perform random access in the target cell (the candidate cell) (that is, fails to be handed over to the target cell), the terminal device re-accesses the source cell and records the random access failure information (that is, the connection failure information) in the target cell. After the terminal device successfully re-accesses the source cell, the terminal device sends the connection failure information to a network device (the first network device) on a network side. The connection failure information is used to indicate that the terminal device fails to be handed over to the target cell. The connection failure information may trigger the first network device to determine the connection failure type (too early handover or handover to a wrong cell) of the terminal device. When the first network device determines that the terminal device camps on the source cell, the first network device determines that the connection failure type of the terminal device is too early handover. When the first network device determines that the terminal device is handed over to a new target cell, the first network device determines that the connection failure type of the terminal device is handover to a wrong cell. After determining the connection failure type of the terminal device, the first network device may optimize the mobility parameter. In this way, too early handover and handover to a wrong cell are determined when no RRC reestablishment is performed in a CHO scenario, and the mobility parameter is optimized, thereby implementing mobility robustness optimization.

Figure 7:
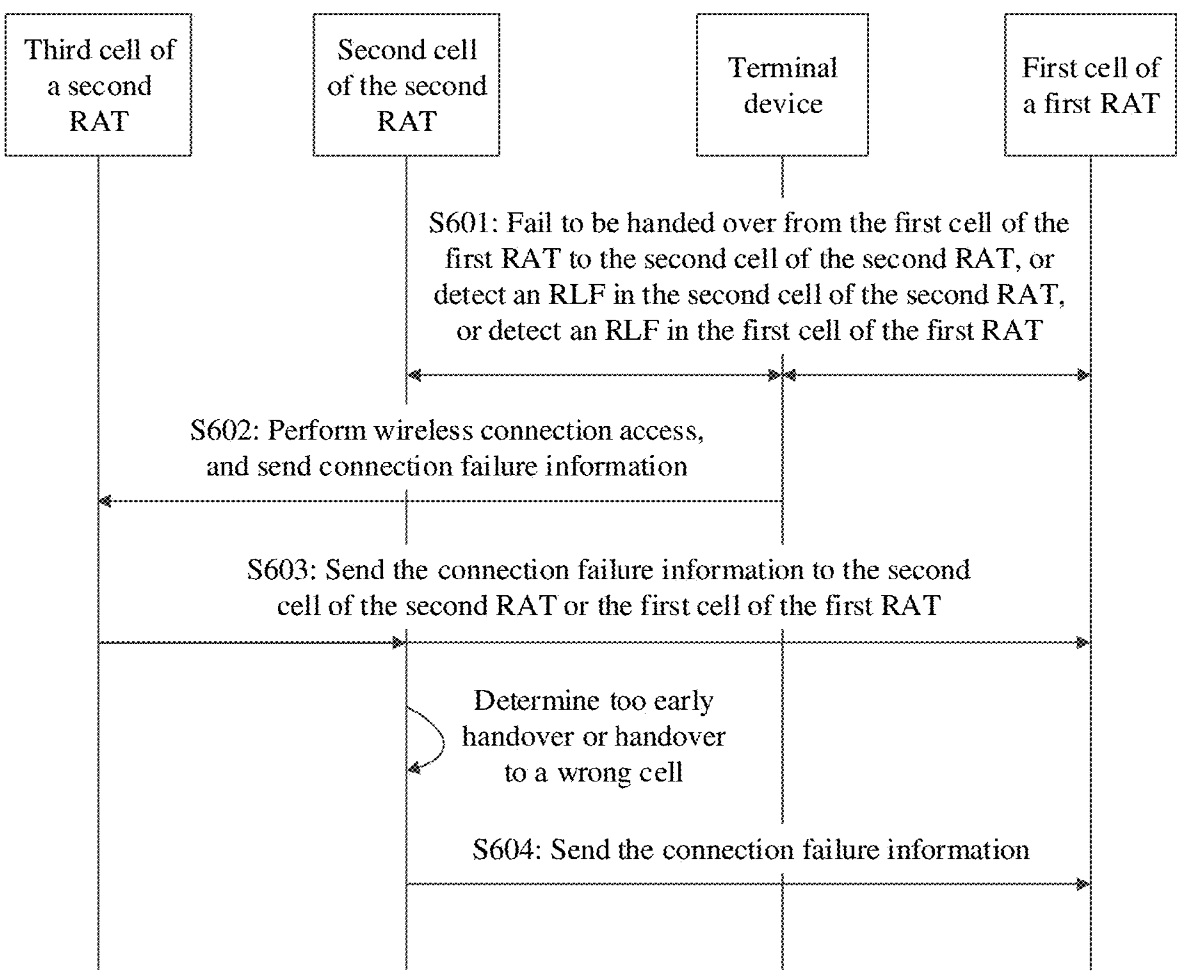
FIG. 7 is a schematic flowchart of a mobility optimization method for different RATs according to an embodiment of this application.

Embodiments of this application further provide a mobility optimization method for different radio access technologies (RATs). The method may be used to determine too late handover, too early handover, and handover to a wrong cell. The mobility optimization method for different RATs may be applied to handover of UE between different radio access technologies in a same system (for example, handover of the UE between an ng-eNB and a gNB), and may also be applied to handover of the UE between different radio access technologies in different systems (for example, handover of the UE between an eNB and a gNB). FIG. 7 is a schematic flowchart of a mobility optimization method for different RATs according to an embodiment of this application. As shown in FIG. 7, the mobility optimization method for different RATs includes but is not limited to the following steps.

S601: UE fails to be handed over from a first cell of a first RAT to a second cell of a second RAT, or UE detects an RLF in a second cell of a second RAT soon after the UE is successfully handed over from a first cell of a first RAT to the second cell, or UE detects an RLF in a first cell of a first RAT.

In some feasible implementations, when the UE is handed over from the first cell (for example, a cell 1) of the first RAT to the second cell (for example, a cell 2) of the second RAT, a handover failure occurs when the UE is handed over to the second cell of the second RAT (usually, when the UE receives a handover message, the UE starts a timer, and when the timer expires, the UE has not completed the handover to the second cell of the second RAT or has not successfully completed a random access procedure in the second cell of the second RAT), and the UE records connection failure information. Such a failure is referred to as a handover failure, that is, a failure type is a handover failure (HOF). The UE performs an RRC reestablishment procedure (the UE performs cell selection in the reestablishment procedure), and the UE includes an identifier of a cell obtained through cell selection by the UE in the connection failure information. The identifier of the cell in this application may be a cell global identifier of the cell, a physical cell identifier of the cell, or the physical cell identifier and a frequency of the cell.

In some feasible implementations, after the UE is successfully handed over from the first cell (for example, the cell 1) of the first RAT to the second cell (for example, the cell 2) of the second RAT, the UE soon experiences the RLF in the second cell (for example, the cell 2). In this case, the UE records the connection failure information. The UE further records information about the first cell (for example, the cell 1) and/or the second cell (for example, the cell 2) in the connection failure information. Such a failure is caused by the RLF, that is, the failure type is RLF. The UE performs an RRC reestablishment procedure (the UE performs cell selection in the reestablishment procedure), and the UE includes an identifier of a cell obtained through cell selection by the UE in the connection failure information.

S602: The UE performs wireless connection access in a third cell of the second RAT, and sends the connection failure information to the third cell (for example, a cell 3) of the second RAT.

In some feasible implementations, after performing RRC reestablishment after step S601, the UE may send the connection failure information in the cell obtained through cell selection. Alternatively, after the UE performs RRC reestablishment after step S601, the UE may perform wireless connection access in another cell of the second RAT after RRC reestablishment fails in the cell obtained through cell selection, and send the connection failure information to the cell in which wireless connection access is performed.

Optionally, the connection failure information may be carried in an RRC message of the second RAT in a form of a container. Optionally, in addition to content carried in the container, the UE needs to additionally include, outside the container, an identifier of a serving cell to which previous handover fails (for example, when the handover from the cell 1 to the cell 2 fails, an identifier of the cell 2 is carried; if the handover from the cell 1 to the cell 2 succeeds but the RLF occurs in the cell 2 soon, an identifier of the cell 2 is carried; or if the RLF is detected in the cell 1, an identifier of the cell 1 is carried). Optionally, the UE may further include a tracking area code (TAC) of the serving cell outside the container. The network device (for example, a base station corresponding to the third cell of the second RAT) receives the connection failure information in the form of the container, and may perform routing based on the identifier of the serving cell, or based on the identifier of the serving cell and the tracking area code of the serving cell, to send the connection failure information to a base station to which the serving cell belongs. In another possible implementation, when the failure type is HOF, the identifier, carried outside the container, of the serving cell to which the previous handover fails is an identifier of a cell in which the terminal device receives a reconfiguration message or a handover command message, that is, an identifier of a cell that is accessed before the reconfiguration message or the handover command message is received. When the failure type is RLF, the identifier, carried outside the container, of the serving cell to which the previous handover fails is an identifier of a cell in which a connection failure occurs. For example, when the handover from the cell 1 to the cell 2 fails, that is, the failure type is HOF, the identifier of the cell 1 is carried outside the container. Optionally, a TAC of the cell 1 may be further carried outside the container. If the handover from the cell 1 to the cell 2 succeeds, but the RLF occurs in the cell 2 soon, the identifier of the cell 2 is carried outside the container. Optionally, a TAC of the cell 2 may be further carried outside the container, and if the RLF is detected in the cell 1, the identifier of the cell 1 is carried outside the container. Optionally, a TAC of the cell 1 may be further carried outside the container.

Optionally, the UE may include type information of the serving cell outside the container. For example, the type information of the serving cell indicates that the serving cell is an LTE cell, an eLTE cell, or an NR cell. For example, the type information of the serving cell is one of LTE, eLTE, or NR. LTE means that the UE is connected to a 4G core network by using an E-UTRAN radio access technology. eLTE means that the UE is connected to a 5G core network by using an E-UTRAN radio access technology. NR means that the UE is connected to a 5G core network by using an NR radio access technology.

Optionally, in a possible implementation, for example, in a manner of predefinition in a protocol, it may be predefined in the protocol that a coding format or an RRC format of the connection failure information may be the same as that for a type of the serving cell. For example, if the serving cell is an LTE cell, a corresponding CGI is a CGI of the LTE cell, and the connection failure information in the container is encoded in an LTE RRC format. In another possible implementation, a coding format of the connection failure information is independent of a type of the serving cell.

S603: The third cell of the second RAT sends the connection failure information to the second cell of the second RAT or the first cell of the first RAT.

In some feasible implementations, the third cell (for example, the cell 3) of the second RAT sends the connection failure information received from the UE to the second cell (for example, the cell 2). The third cell of the second RAT may send, across core networks, the connection failure information to a base station corresponding to the second cell (that is, the connection failure information is first sent to a core network, and then the core network forwards the connection failure information to the base station corresponding to the second cell). The third cell of the second RAT may alternatively send the connection failure information to a base station corresponding to the second cell through an interface (for example, an Xn interface) between base stations. The connection failure information may alternatively be sent to a base station corresponding to the second cell in the form of the container. Optionally, when the third cell of the second RAT sends the connection failure information to the second cell, an RRC format corresponding to a specific RAT used by the connection failure information or an RRC format of a specific RAT in which the connection failure information is encoded or an RRC format of a specific RAT in which the UE performs encoding is additionally carried, for example, an LTE form or an NR form, or an LTE form, an NR form, or an eLTE form. The LTE form is an RRC format of a radio air interface when the UE is connected to the 4G core network by using the E-UTRAN radio access technology. The eLTE form is an RRC format of a radio air interface when the UE is connected to the 5G core network by using the E-UTRAN radio access technology. The NR form is an RRC format of a radio air interface when the UE is connected to the 5G core network by using the NR radio access technology. Optionally, in a possible implementation, the third cell of the second RAT receives, from the UE, type information, reported by the UE, of the serving cell to which the UE fails to be handed over, and determines, based on the type information of the serving cell, the RRC format corresponding to the specific RAT used by the connection failure information or the RRC format of the specific RAT in which the connection failure information is encoded or the RRC format of the specific RAT in which the UE performs encoding. For example, in the manner of predefinition in the protocol, it is predefined in the protocol that the coding format or the RRC format of the connection failure information may be the same as that for the type of the serving cell. The third cell of the second RAT may determine, based on the type information of the serving cell, the RRC format corresponding to the specific RAT used by the connection failure information or the RRC format of the specific RAT in which the connection failure information is encoded or the RRC format of the specific RAT in which the UE performs encoding.

Optionally, when sending the connection failure information to the second cell, the third cell of the second RAT additionally includes the identifier, reported by the UE, of the serving cell to which the UE fails to be handed over (for example, when the handover from the cell 1 to the cell 2 fails, the identifier of the cell 2 is carried; or if the handover from the cell 1 to the cell 2 succeeds but the RLF occurs in the cell 2 soon, the identifier of the cell 2 is carried; or for example, when the handover from the cell 1 to the cell 2 fails, that is, the failure type is HOF, the identifier of the cell 1 is carried; or if the handover from the cell 1 to the cell 2 succeeds but the RLF occurs in cell 2 soon, the identifier of the cell 2 is carried). Optionally, when sending the connection failure information to the second cell, the third cell of the second RAT additionally includes the tracking area code (TAC), reported by the UE, of the serving cell to which the UE fails to be handed over. Specifically, for descriptions of the identifier, reported by the UE, of the serving cell to which the UE fails to be handed over and the tracking area code of the serving cell, refer to the descriptions in S602.

The base station corresponding to the second cell determines whether the previous handover is too early handover or handover to a wrong cell.

In some feasible implementations, the third cell (for example, the cell 3) of the second RAT sends the connection failure information received from the UE to the first cell (for example, the cell 1). The third cell of the second RAT may send, across core networks, the connection failure information to a base station corresponding to the first cell (that is, the connection failure information is first sent to a core network, and then the core network forwards the connection failure information to the base station corresponding to the first cell). The third cell of the second RAT may alternatively send the connection failure information to a base station corresponding to the first cell through an interface (for example, an Xn interface) between base stations. The connection failure information may alternatively be sent to a base station corresponding to the first cell in the form of the container. Optionally, when the third cell of the second RAT sends the connection failure information to the first cell, an RRC format corresponding to a specific RAT used by the connection failure information or an RRC format of a specific RAT in which the connection failure information is encoded or an RRC format of a specific RAT in which the UE performs encoding is additionally carried, for example, an LTE form or an NR form, or an LTE form, an NR form, or an eLTE form. The LTE form is an RRC format of a radio air interface when the UE is connected to the 4G core network by using the E-UTRAN radio access technology. The eLTE form is an RRC format of a radio air interface when the UE is connected to the 5G core network by using the E-UTRAN radio access technology. The NR form is an RRC format of a radio air interface when the UE is connected to the 5G core network by using the NR radio access technology. Optionally, when the third cell of the second RAT sends the connection failure information to the first cell (for example, the third cell sends the connection failure information to the core network), the identifier, reported by the UE, of the serving cell to which the UE fails to be handed over is additionally carried. Optionally, the TAC of the serving cell may be further carried. For descriptions of the identifier and the TAC of the serving cell to which the UE fails to be handed over, refer to the descriptions in S602. Details are not described herein again. The base station corresponding to the first cell determines whether the previous handover is too late handover or handover to a wrong cell.

S604: The second cell of the second RAT sends the connection failure information to the first cell of the first RAT.

In some feasible implementations, after the base station corresponding to the second cell determines whether the previous handover is too early handover or handover to a wrong cell, the base station corresponding to the second cell sends a handover report to the first cell of the first RAT, where the handover report is used to indicate whether the previous handover is too early handover or handover to a wrong cell. For example, the handover report sent by the base station corresponding to the second cell to the base station corresponding to the first cell of the first RAT carries information indicating whether the previous handover is too early handover or handover to a wrong cell. The base station corresponding to the second cell further sends the received connection failure information to the base station corresponding to the first cell. The connection failure information may alternatively be sent to the base station corresponding to the first cell in the form of the container. Optionally, when the second cell of the second RAT sends the connection failure information to the first cell, an RRC format corresponding to a specific RAT used by the connection failure information or an RRC format of a specific RAT in which the connection failure information is encoded or an RRC format of a specific RAT in which the UE performs encoding is additionally carried. After receiving the information, the first cell of the first RAT may optimize a mobility parameter. The second cell of the second RAT may send, across core networks, the connection failure information to the base station corresponding to the first cell (that is, the connection failure information is first sent to a core network, and then the core network forwards the connection failure information to the base station corresponding to the first cell). The second cell of the second RAT may alternatively send the connection failure information to the base station corresponding to the first cell through an interface (for example, an Xn interface) between base stations. Optionally, when the second cell of the second RAT sends the connection failure information to the first cell (for example, the second cell sends the connection failure information to the core network), the identifier, reported by the UE, of the serving cell to which the UE fails to be handed over is additionally carried. Optionally, the TAC of the serving cell may be further carried. For descriptions of the identifier and the TAC of the serving cell to which the UE fails to be handed over, refer to the descriptions in S602. Details are not described herein again.

It may be understood that in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed. The communication method in embodiments of this application is described in detail above. To better implement the foregoing solutions in embodiments of this application, embodiments of this application further provide a corresponding apparatus or device.

Figure 8:
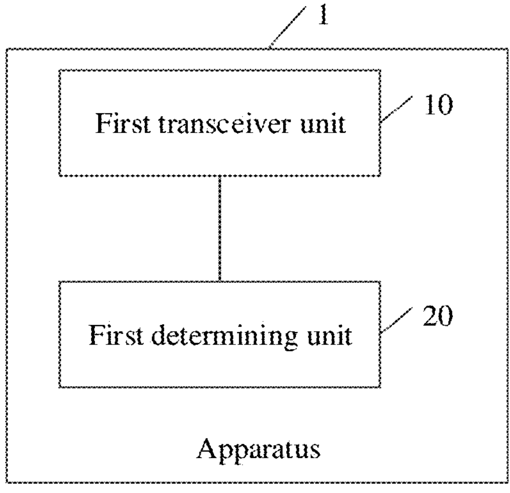
FIG. 8 is a schematic structural diagram of an apparatus according to an embodiment of this application.

FIG. 8 is a schematic structural diagram of an apparatus according to an embodiment of this application. The apparatus may be a network device or a chip or a circuit that may be disposed in the network device. As shown in FIG. 8, the apparatus 1 may include: a first transceiver unit 10, configured to receive connection failure information from a terminal device, where the connection failure information is used to indicate that the terminal device detects a radio link failure RLF in a first cell or fails to be handed over to the first cell, there is a wireless connection between the terminal device and a second cell in a procedure of handover from the second cell to the first cell, and the second cell is a cell managed by a first network device; and a first determining unit 20, configured to determine a connection failure type of the terminal device. The first cell is a target cell, and the second cell is a source cell.

In some feasible implementations, the first determining unit 20 is specifically configured to: when the first determining unit 20 determines that the terminal device keeps the wireless connection to the second cell after the terminal device detects the RLF in the first cell or fails to be handed over to the first cell, determine that the connection failure type of the terminal device is too early handover; or when the first determining unit 20 determines that a third cell is a cell to be accessed by the terminal device, determine that the connection failure type of the terminal device is handover to a wrong cell, where the third cell is different from the first cell and the second cell.

In some feasible implementations, the first cell is a candidate cell that is in at least one candidate cell of the terminal device and that satisfies a CHO trigger condition, and the third cell is different from the second cell and any one of the at least one candidate cell.

In some feasible implementations, the connection failure information is used to indicate that the terminal device fails to be handed over to the first cell. The first transceiver unit 10 is further configured to send first indication information to the terminal device, where the first indication information is used to indicate the terminal device to access the second cell when the terminal device fails to be handed over to the first cell.

The first determining unit 20 may be a processing unit.

During specific implementation, for implementation of each module or unit, correspondingly, refer to corresponding descriptions of the first network device in the method embodiment shown in FIG. 2 or FIG. 6, to perform the method and the function performed by the first network device in the foregoing embodiment.

According to this embodiment of this application, the network device determines too early handover and handover to a wrong cell when no RRC reestablishment is performed in a mobility enhancement scenario or a CHO scenario, and optimizes a mobility parameter, thereby implementing mobility robustness optimization.

Figure 9:
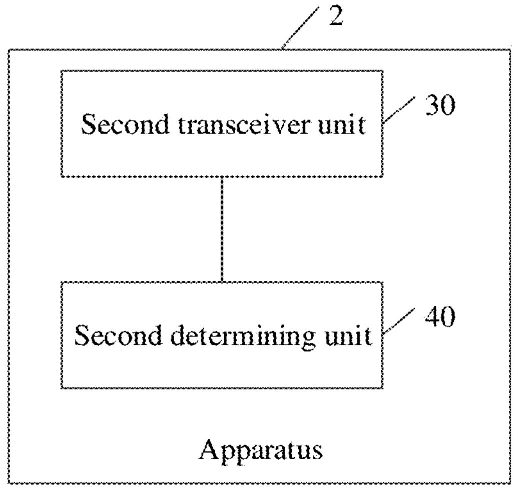
FIG. 9 is another schematic structural diagram of an apparatus according to an embodiment of this application.

FIG. 9 is another schematic structural diagram of an apparatus according to an embodiment of this application. The apparatus may be a network device or a chip or a circuit that may be disposed in the network device. As shown in FIG. 9, the apparatus 2 may include: a second transceiver unit 30, configured to receive connection failure information, where the connection failure information is used to indicate that a terminal device detects an RLF in a first cell in a procedure of handover from the first cell to a second cell, and the first cell is a cell managed by the first network device; and a second determining unit 40, configured to determine a connection failure type of the terminal device.

In some feasible implementations, the second determining unit 40 is specifically configured to: when the second determining unit 40 determines that time for which the terminal device camps on the first cell is greater than a second threshold and the terminal device successfully accesses the second cell, determine that the connection failure type of the terminal device is too late handover.

In this application, the time for which the terminal device camps on the first cell is time for which the terminal device keeps an RRC connection to the first cell, or time for which the terminal device keeps a wireless connection to the first cell, or time for which the terminal device has a connection to the first cell but does not receive a handover command.

In some feasible implementations, the second cell is a candidate cell that is in at least one candidate cell of the terminal device and that satisfies a CHO trigger condition.

The second determining unit 40 may be a processing unit.

During specific implementation, for implementation of each module or unit, correspondingly, refer to corresponding descriptions of the first network device in the method embodiment shown in FIG. 3 or FIG. 5, to perform the method and the function performed by the first network device in the foregoing embodiment.

According to this embodiment of this application, the network device determines too late handover when no RRC reestablishment is performed in a mobility enhancement scenario or a CHO scenario, and optimizes a mobility parameter, thereby implementing mobility robustness optimization.

Figure 10:
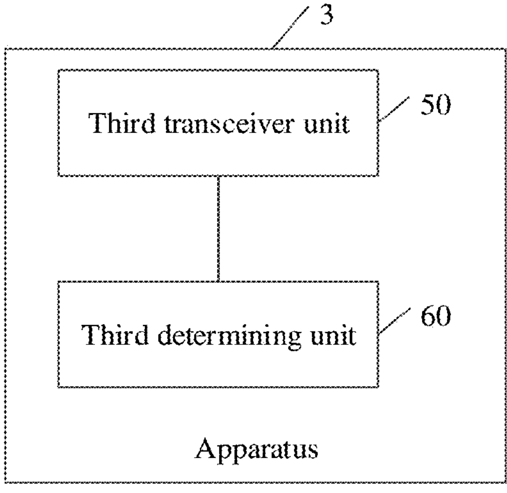
FIG. 10 is still another schematic structural diagram of an apparatus according to an embodiment of this application.

FIG. 10 is still another schematic structural diagram of an apparatus according to an embodiment of this application. The apparatus may be a network device or a chip or a circuit that may be disposed in the network device. As shown in FIG. 10, the apparatus 3 may include: a third transceiver unit 50, configured to receive connection failure information from a second network device, where the connection failure information is used to indicate that a terminal device detects an RLF in a master cell group MCG managed by the first network device; and a third determining unit 60, configured to determine a connection failure type of the terminal device.

In some feasible implementations, the third determining unit 60 is specifically configured to: when the third determining unit 60 determines that a fourth cell is a cell to be accessed by the terminal device, determine that the connection failure type of the terminal device is too late handover, where the fourth cell is different from a primary cell in the MCG managed by the first network device.

In some feasible implementations, the third determining unit 60 is specifically configured to: when the third determining unit 60 determines that a fifth cell is a cell to be accessed by the terminal device, determine that the connection failure type of the terminal device is too early handover, where the fifth cell is a cell that is accessed before a primary cell in the MCG managed by the first network device is handed over to; or when the third determining unit 60 determines that a sixth cell is a cell to be accessed by the terminal device, determine that the connection failure type of the terminal device is handover to a wrong cell, where the sixth cell is different from a primary cell in the MCG managed by the first network device and the fifth cell.

In some feasible implementations, the third transceiver unit 50 is further configured to send second indication information to a source master network device, where the second indication information is used to indicate that the connection failure type of the terminal device is too early handover or handover to a wrong cell.

The third determining unit 60 may be a processing unit.

During specific implementation, for implementation of each module or unit, correspondingly, refer to corresponding descriptions of the first network device in the method embodiment shown in FIG. 4, to perform the method and the function performed by the first network device in the foregoing embodiment.

According to this embodiment of this application, the network device determines too late handover, too early handover, and handover to a wrong cell when the RLF occurs in the MCG in a dual connectivity scenario, and optimizes a mobility parameter, thereby implementing mobility robustness optimization.

Figure 11:
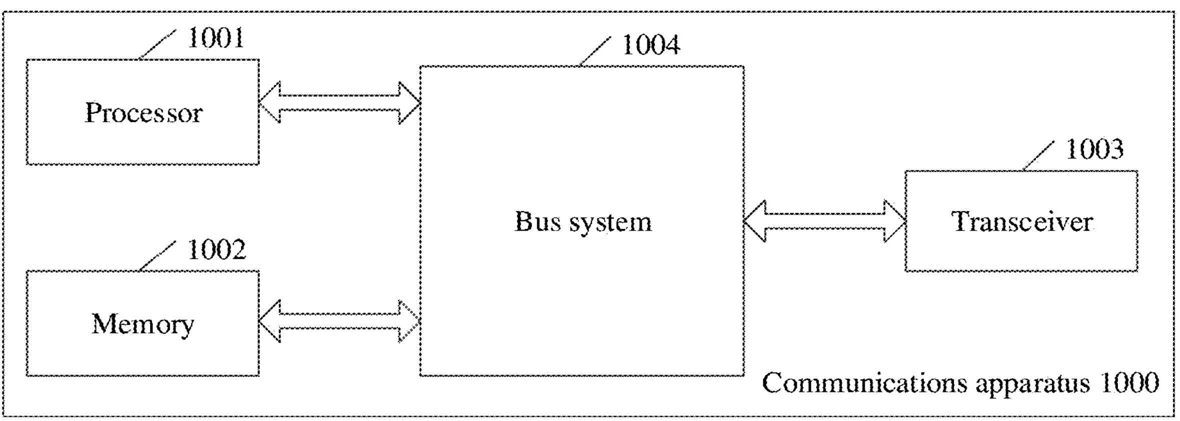
FIG. 11 is a schematic structural diagram of a communications apparatus according to an embodiment of this application.

FIG. 11 is a schematic structural diagram of a communications apparatus according to an embodiment of this application. As shown in FIG. 11, the communications apparatus 1000 provided in this embodiment of this application includes a processor 1001, a memory 1002, a transceiver 1003, and a bus system 1004. The communications apparatus provided in this embodiment of this application may be any one of a first network device, a second network device, and a terminal device.

The processor 1001, the memory 1002, and the transceiver 1003 are connected by using the bus system 1004.

The memory 1002 is configured to store a program. Specifically, the program may include program code, and the program code includes computer operation instructions. The memory 1002 includes but is not limited to a random access memory (RAM), a read-only memory (ROM), an erasable programmable read-only memory (erasable programmable read only memory, EPROM), or a compact disc read-only memory (CD-ROM). Only one memory is shown in FIG. 11. Certainly, a plurality of memories may be disposed as required. The memory 1002 may alternatively be a memory in the processor 1001. This is not limited herein.

The memory 1002 stores the following elements, executable units or data structures, or subsets or extended sets thereof:

operation instructions, including various operation instructions for implementing various operations; and an operating system, including various system programs for implementing various basic services and processing hardware-based tasks.

The processor 1001 controls an operation of the communications apparatus 1000. The processor 1001 may be one or more central processing units (CPUs). When the processor 1001 is one CPU, the CPU may be a single-core CPU, or may be a multi-core CPU.

During specific application, components of the communications apparatus 1000 are coupled together by using the bus system 1004. In addition to a data bus, the bus system 1004 includes a power bus, a control bus, a status signal bus, and the like. However, for clear description, various buses in FIG. 11 are marked as the bus system 1004. For ease of illustration, FIG. 11 shows merely an example of the bus system 1004.

Any one of FIG. 2 to FIG. 6 provided in embodiments of this application or the method of the first network device disclosed in the foregoing embodiments; or any one of FIG. 2 to FIG. 6 provided in embodiments of this application or the method of the terminal device in the foregoing embodiments; or any one of FIG. 3 to FIG. 5 provided in embodiments of this application or the method of the second network device in the foregoing embodiments may be applied to the processor 1001 or implemented by the processor 1001. The processor 1001 may be an integrated circuit chip and has a signal processing capability. In an implementation process, each step in the foregoing method may be completed by using an integrated logic circuit of hardware in the processor 1001 or an instruction in a form of software. The foregoing processor 1001 may be a general-purpose processor, a digital signal processor (DSP), an application-specific integrated circuit (application specific integrated circuit, ASIC), a field programmable gate array (field-programmable gate array, FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1002, and the processor 1001 reads information in the memory 1002, and performs, in combination with hardware of the processor 1001, the method steps of the first network device described in any one of FIG. 2 to FIG. 6, or perform, in combination with hardware of the processor 1001, the method steps of the terminal device described in any one of FIG. 2 to FIG. 6, or perform, in combination with hardware of the processor 1001, the method steps of the second network device described in any one of FIG. 3 to FIG. 5.

An embodiment of this application further provides a computer program product. The computer program product includes computer program code, and when the computer program code is run on a computer, the computer is enabled to perform the method steps of the first network device described in FIG. 2, FIG. 3, FIG. 4, FIG. 5, or FIG. 6, or when the computer program code is run on a computer, the computer is enabled to perform the method steps of the terminal device described in FIG. 2, FIG. 3, FIG. 4, FIG. 5, or FIG. 6.

An embodiment of this application further provides an apparatus. The apparatus may be a chip. The chip includes a processor. The processor is configured to read and execute a computer program stored in a memory, to perform the mobility optimization method according to any one of the possible implementations in FIG. 2 to FIG. 6. Optionally, the chip further includes the memory, and the memory is connected to the processor by using a circuit or a wire. Further, optionally, the chip further includes a communications interface, and the processor is connected to the communications interface. The communications interface is configured to receive data and/or information that need/needs to be processed. The processor obtains the data and/or the information from the communications interface, processes the data and/or the information, and outputs a processing result through the communications interface. The communications interface may be an input/output interface.

Optionally, the processor and the memory may be physically independent units, or the memory may be integrated with the processor.

Another embodiment of this application further provides a communications system. The communications system includes a first network device, and optionally, further includes a terminal device. Alternatively, the communications system includes a first network device and a second network device, and optionally, further includes a terminal device. For example, the first network device may be the first network device in the mobility optimization method provided in FIG. 2 or FIG. 6, and the terminal device may be the terminal device in the mobility optimization method provided in FIG. 2 or FIG. 6. Alternatively, the first network device may be the first network device in the mobility optimization methods provided in FIG. 3 to FIG. 5, the second network device may be the second network device in the mobility optimization methods provided in FIG. 3 to FIG. 5, and the terminal device may be the terminal device in the mobility optimization methods provided in FIG. 3 to FIG. 5.

A person of ordinary skill in the art may understand that all or some of the procedures of the methods in embodiments may be implemented by a computer program instructing related hardware. The program may be stored in a computer-readable storage medium. When the program is executed, the procedures in the method embodiments may be included. The storage medium includes any medium that can store program code, such as a ROM or a random access memory RAM, a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, performed by a terminal device or a chip for the terminal device, the communication method comprising:

accessing a third cell of a first network device; and sending connection failure information and an identifier of a first cell to the first network device using a radio resource control (RRC) message, wherein the first cell is a cell from which the terminal device receives a reconfiguration message or a handover command message and a handover failure occurs in a procedure in which the terminal device attempts to be handed over from the first cell of a source network device to a second cell of a target network device, or the first cell is a cell in which a radio link failure occurs on the terminal device, wherein the first cell uses a first radio access technology, the second cell and the third cell use a second radio access technology different from the first radio access technology, the connection failure information is in a form of a container in the RRC message, and the identifier of the first cell is outside the container, and wherein the following is also carried in the RRC message and also outside the container:

type information of the first cell, wherein the type information indicates that the first cell is a long term evolution (LTE) cell, an eLTE cell, or a new radio (NR) cell.

2. The method according to claim 1, wherein the second radio access technology is new radio (NR), and the first radio access technology is evolved universal terrestrial radio access (E-UTRA).

3. The method according to claim 1, wherein the identifier of the first cell comprises a cell global identifier (CGI).

4. The communication method according to claim 1, wherein the following is also carried in the RRC message and also outside the container: a tracking area code (TAC) of the first cell.

5. A communication method, performed by a first network device or a chip for the first network device, the communication method comprising:

receiving a radio resource control (RRC) message from a terminal device after the terminal device accesses a third cell of the first network device, wherein the RRC message comprises connection failure information and an identifier of a first cell, and the first cell is a cell from which a reconfiguration message or a handover command message is sent to the terminal device and a handover failure occurs in a procedure in which the terminal device attempts to be handed over from the first cell of a source network device to a second cell of a target network device or the first cell is a cell in which a connection failure of the terminal device occurs; and determining the identifier of the first cell based on the RRC message, wherein the first cell uses a first radio access technology, the second cell and the third cell use a second radio access technology different from the first radio access technology, the connection failure information is in a form of a container in the RRC message, and the identifier of the first cell is outside the container, and wherein the following is also carried in the RRC message and also outside the container:

type information of the first cell, wherein the type information indicates that the first cell is a long term evolution (LTE) cell, an eLTE cell, or, a new radio (NR) cell.

6. The method according to claim 5, further comprising:

sending, to a second network device through an interface between the first network device and the second network device, the connection failure information and information indicating a radio access technology of an RRC format of the connection failure information, the RRC format being used by the connection failure information, wherein the second network device manages the first cell.

7. The method according to claim 5, further comprising:

sending, to a second network device through a core network device, the connection failure information and information indicating a radio access technology of an RRC format that is used by the connection failure information, wherein the second network device manages the first cell.

8. The method according to claim 5, wherein the identifier of the first cell comprises a cell global identifier (CGI).

9. The method according to claim 5, wherein the second radio access technology is new radio (NR) and the first radio access technology is evolved universal terrestrial radio access (E-UTRA).

10. The communication method according to claim 5, wherein the following is also carried in the RRC message and also outside the container: a tracking area code (TAC) of the first cell.

11. An apparatus, wherein the apparatus is a terminal device, or a chip or a circuit disposed in the terminal device, and the apparatus comprises at least one processor and a memory, wherein the memory stores a computer program, the computer program comprises program instructions, and when the at least one processor runs the program instructions, the apparatus is enabled to perform:

accessing a third cell of a first network device; and sending connection failure information and an identifier of a first cell to the first network device using a radio resource control (RRC) message, wherein the first cell is a cell from which the terminal device receives a reconfiguration message or a handover command message and a handover failure occurs in a procedure in which the terminal device attempts to be handed over from the first cell of a source network device to a second cell of a target network device, or the first cell is a cell in which a connection failure of the terminal device occurs, wherein the first cell uses a first radio access technology, the second cell and the third cell use a second radio access technology different from the first radio access technology, the connection failure information is in a form of a container in the RRC message, and the identifier of the first cell is outside the container, and wherein the following is also carried in the RRC message and also outside the container:

type information of the first cell, wherein the type information indicates that the first cell is a long term evolution (LTE) cell, an eLTE cell, or a new radio (NR) cell.

12. The apparatus according to claim 11, wherein the second radio access technology is new radio (NR), and the first radio access technology is evolved universal terrestrial radio access (E-UTRA).

13. The apparatus according to claim 11, wherein the identifier of the first cell comprises a cell global identifier (CGI).

14. The apparatus according to claim 11, wherein the following is also carried in the RRC message and also outside the container: a tracking area code (TAC) of the first cell.

15. An apparatus, wherein the apparatus is a first network device, or a chip or a circuit disposed in the first network device, and the apparatus comprises at least one processor configured to perform:

receiving a radio resource control (RRC) message from a terminal device after the terminal device accesses a third cell of the first network device, wherein the RRC message comprises connection failure information and an identifier of a first cell, and the first cell is a cell from which a reconfiguration message or a handover command message is sent to the terminal device and a handover failure occurs in a procedure in which the terminal device attempts to be handed over from the first cell of a source network device to a second cell of a target network device or the first cell is a cell in which a connection failure of the terminal device occurs; and determining the identifier of the first cell based on the RRC message, wherein the first cell uses a first radio access technology, the second cell and the third cell uses a second radio access technology different from the first radio access technology, the connection failure information is in a form of a container in the RRC message, and the identifier of the first cell is outside the container, and wherein the following is also carried in the RRC message and also outside the container:

type information of the first cell, wherein the type information indicates that the first cell is a long term evolution (LTE) cell, an eLTE cell, or, a new radio (NR) cell.

16. The apparatus according to claim 15, wherein the apparatus is further enabled to perform:

sending, to a second network device through an interface between the first network device and the second network device, or, through a core network device, the connection failure information and information indicating a radio access technology of an RRC format of the connection failure information, the RRC format being used by the connection failure information, wherein the second network device manages the first cell.

17. The apparatus according to claim 15, wherein the identifier of the first cell comprises a cell global identifier (CGI).

18. The apparatus according to claim 15, wherein the second radio access technology is new radio (NR) and the first radio access technology is evolved universal terrestrial radio access (E-UTRA).

19. The apparatus according to claim 15, wherein the following is also carried in the RRC message and also outside the container: a tracking area code (TAC) of the first cell.

* * * * *